(12) United States Patent
Saito et al.

(10) Patent No.: US 11,929,049 B2
(45) Date of Patent: Mar. 12, 2024

(54) OUTPUT CONTENT GENERATION APPARATUS, OUTPUT CONTENT GENERATION METHOD AND PROGRAM

(71) Applicant: NIPPON TELEGRAPH AND TELEPHONE CORPORATION, Tokyo (JP)

(72) Inventors: Toshihide Saito, Tokyo (JP); Yumiko Matsuura, Tokyo (JP); Kiyoshi Nakahama, Tokyo (JP); Masahiro Watanabe, Tokyo (JP); Junichi Sawase, Tokyo (JP); Sayaka Teranaka, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 8 days.

(21) Appl. No.: 17/282,138

(22) PCT Filed: Sep. 20, 2019

(86) PCT No.: PCT/JP2019/036983
§ 371 (c)(1),
(2) Date: Apr. 1, 2021

(87) PCT Pub. No.: WO2020/071158
PCT Pub. Date: Apr. 9, 2020

(65) Prior Publication Data
US 2021/0358458 A1 Nov. 18, 2021

(30) Foreign Application Priority Data
Oct. 4, 2018 (JP) .................................. 2018-189448

(51) Int. Cl.
*G09G 5/38* (2006.01)
*G06F 3/0483* (2013.01)
*G09G 3/20* (2006.01)

(52) U.S. Cl.
CPC ............. *G09G 5/38* (2013.01); *G06F 3/0483* (2013.01); *G09G 3/20* (2013.01); *G09G 2340/0407* (2013.01); *G09G 2340/0464* (2013.01)

(58) Field of Classification Search
None
See application file for complete search history.

(56) References Cited

U.S. PATENT DOCUMENTS

2008/0235563 A1* 9/2008 Nakamura ............ G06F 3/0483
715/200
2013/0187944 A1* 7/2013 Hamana ................ G06F 3/0485
345/619

(Continued)

FOREIGN PATENT DOCUMENTS

JP 2008234148 A 10/2008

OTHER PUBLICATIONS

Masui et al. (2000) "A Study of Information Display and Execution Method for Personal Digital Assistants" Information Processing Society of Japan Research Report, pp. 25-30.

(Continued)

*Primary Examiner* — Yi Wang

(57) ABSTRACT

An output content generation device, includes: a first calculation unit that calculates a size, in a display region of a display device, of each of pieces of information to be displayed in the display region; a determination unit that determines whether or not the pieces of information are arrangeable in the display region, based on the size of each of the pieces of information and a size of the display region; and a generation unit that allocates the pieces of information (Continued)

in a plurality of screens accommodated in the display region in a distributed manner, and generates output content of the pieces of information, when the pieces of information are not arrangeable in the display region, thereby enabling information to be legibly viewable.

20 Claims, 27 Drawing Sheets

(56) References Cited

U.S. PATENT DOCUMENTS

| | | | |
|---|---|---|---|
| 2014/0164971 A1* | 6/2014 | Chen | G06F 3/0484 715/771 |
| 2016/0109257 A1* | 4/2016 | Horvitz | G06F 16/4393 701/532 |
| 2019/0371265 A1* | 12/2019 | Sakamoto | G09G 5/006 |

OTHER PUBLICATIONS

Watanabe et al. (2018) "Study on the difference of user's reading method for digital signage contents" Human Interface Symposium, Sep. 5, 2018, pp. 38-45.

Teranaka et al. (2018) "Development of content generation system for digital signage with layout optimization WEBDesign Converter" 2018 Annual Meeting of the Society of Video and Information Media, 2 pages.

Watanabe et al. (2018) "Evaluation of efficiency for contents creation by"WEB Design Converter" and the content's visibility" 2018 Annual Meeting of the Society of Video and Information Media, 2 pages.

* cited by examiner

Fig. 6

| ARTICLE TYPE | ARTICLE ELEMENT ITEM /121 | | | | |
|---|---|---|---|---|---|
| EVENT | TITLE | IMAGE | DATE AND TIME | PLACE | DESCRIPTION |
| ANNOUNCEMENT | TITLE | IMAGE | ANNOUNCEMENT TYPE | DESCRIPTION | CONTACT |
| SIGHTSEEING | TITLE | IMAGE | PLACE | SIGHT | DESCRIPTION |

Fig. 7

Article Registration Screen (2/2) ~520

Title
Dai21KaiXXKouEnSaKuRaMatsuRi (21-th XX Park Cherry Blossom Festival)

Image
[Select] hanami.jpg

Date and time
NichiJi:2018Nen3Gatsu18Nichi (Date and time: Mar. 18, 2018)

Place
KaiJou:XXKouEn (Venue: XX Park)

DESCRIPTION
YYYEkiKaRaAruITeSuGuNoToKoRoNiARu KouEnDeSu. SakuraNoJiKiNiHa, EnNaiHaSakuraNoHanaDeITsuPaINiNaRi MaSu. (The Park is a short walk from YYY station. The Park is full of cherry blossoms at the cherry blossom season.)

[Register] ~521

Fig. 9

ARTICLE TYPE="EVENT"

T1

| ARTICLE NAME | TITLE | IMAGE | DATE AND TIME | PLACE | DESCRIPTION |
|---|---|---|---|---|---|
| hoge | XXKouEnSaKuRaMatsuRi (XX Park Cherry Blossom Festival) | hanami.jpg | NichiJi:2018Nen3Gatsu18Nichi (Date and time: Mar. 18, 2018) | KaiJou:XXKouEn (Venue: XX Park) | YYYEkiKaRaArulTeSuGuNoToKoRoNiARuKouEnDeSu. SakuraNoJiKiNiHa, EnNaiHaSakuraNoHanaDeITsuPaINiNaRiMaSu. (The Park is a short walk from YYY station. The Park is full of cherry blossoms at the cherry blossom season.) |
| | | | | | |
| | | | | | |
| | | | | | |

Fig. 10

ARTICLE TYPE="EVENT"                                                T1

| ARTICLE NAME | TITLE | IMAGE | DATE AND TIME | PLACE | DESCRIPTION |
|---|---|---|---|---|---|
| hoge | Dai21KaiXXKouEnSaKuRaMatsuRi (21-th XX Park Cherry Blossom Festival) | hanami.jpg | NichiJi:2018Nen3Gatsu18Nichi (Date and time: Mar. 18, 2018) | KaiJou:XXKouEn (Venue: XX Park) | YYYEkiKaRaArulTeSuGuNoTokoRoNiARuKouEnDeSu.SakuraNoJiKiNiHa, EnNaiHaSakuraNoHanaDeITsuPaINiNaRIMaSu. (The Park is a short walk from YYY station. The Park is full of cherry blossoms at the cherry blossom season.) |
| hogera | ZZ Shore Festival Firework Display | miura.jpg | Aug. 8, 2018 | ZZ Shore | One of major summer events, ZZ Shore... |
| piyo | YYY Foodie Meal Festival | meshistory.jpg | Sep. 18, 2018 | 59 shops in City | Enjoy 5-type "Foodie Meals"!! At target shops, 5. |
| fuga | YYY Meat Festival | iiniku.jpg | Nov. 29, 2018 | 26 shops in YYY City | Nov. 29 is Good Meat Day, on this special day... |
| ... | ... | ... | ... | ... | ... |

Fig. 13

```
<html>
<head>
<link rel="stylesheet" type="text/css" href="style.css">
<script type="text/javascript" src="script.js"></script>
</head>
<body>
<div id="main">
    <h1 id="title"></h1>                    ← e1
    <img id="image" src=""></img>           ← e2
    <div id="text"></div>                   ← e3
</div>
</body>
</html>
```

***.html

```
#main{
  margin: ***px;
  font-size: ***px;
  ...
}
#title{
  margin : ***px;
  font-size : ***px;
  ...
}
#image{
  margin : ***px;
  height: ***px;
  ...
}
#text{
  margin: ***px;
  font-size: ***px;
  ...
}
```

*** css

HIGHT OF EACH ELEMENT ITEM OF ARTICLE "hoge"

| ARTICLE ELEMENT ITEM | ARTICLE ELEMENT | SYMBOL | HEIGHT (px) |
|---|---|---|---|
| TITLE | Dai21KaiXXKouEnSakuraMaTsuRi (21-th XX Park Cherry Blossom Festival) | h1[height] | 492 |
| IMAGE | hanami.jpg | img[height] | 900 |
| DATE AND TIME | NichiJi:2018Nen3Gatsu18Nichi (Date and time: Mar. 18, 2018) | elem1[height] | 260 |
| PLACE | KaiJou:XXKouEn (Venue: XX Park) | elem2[height] | 260 |
| DESCRIPTION | YYYEkiKaRaAruITeSuGuNoToKoRoNiARuKouEnDeSu. SakuraNoJiKiNiHa, EnNaiHaSakuraNoHanaDeITsuPaINiNaRiMaSu. (The Park is a short walk from YYY station. The Park is full of cherry blossoms at the cherry blossom season.) | elem3[height] | 344 |

Fig. 17

ARTICLE TYPE = "EVENT", PARAMETER (DISPLAY ORIENTATION) = "PORTRAIT"

T2

| ARTICLE ELEMENT ITEM | LAYOUT IN AREA | AREA LAYOUT | COMMONLY DISPLAYED ON ALL SCREENS | TARGET SCREEN |
|---|---|---|---|---|
| TITLE | CENTERED | CENTERED | ○ | ALL SCREENS |
| IMAGE | CENTERED | CENTERED | ○ | ALL SCREENS |
| DATE AND TIME | LEFT-ALIGNED | CENTERED | × | |
| PLACE | LEFT-ALIGNED | CENTERED | × | |
| DESCRIPTION | LEFT-ALIGNED | CENTERED | × | |

Fig. 18

| ARTICLE ELEMENT ITEM | LAYOUT IN AREA | AREA LAYOUT | COMMONLY DISPLAYED ON ALL SCREENS | TARGET SCREEN |
|---|---|---|---|---|
| TITLE | CENTERED | CENTERED | ○ | ALL SCREENS |
| IMAGE | CENTERED | CENTERED | ○ | ALL SCREENS |
| DATE AND TIME | LEFT-ALIGNED | CENTERED | × | 1 |
| PLACE | LEFT-ALIGNED | CENTERED | × | 1 |
| DESCRIPTION | LEFT-ALIGNED | CENTERED | × | 2 |

Fig. 19
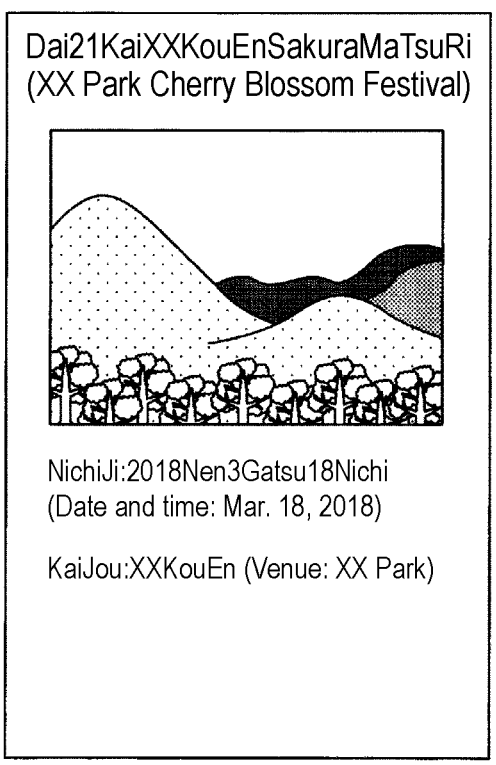
FIRST SCREEN
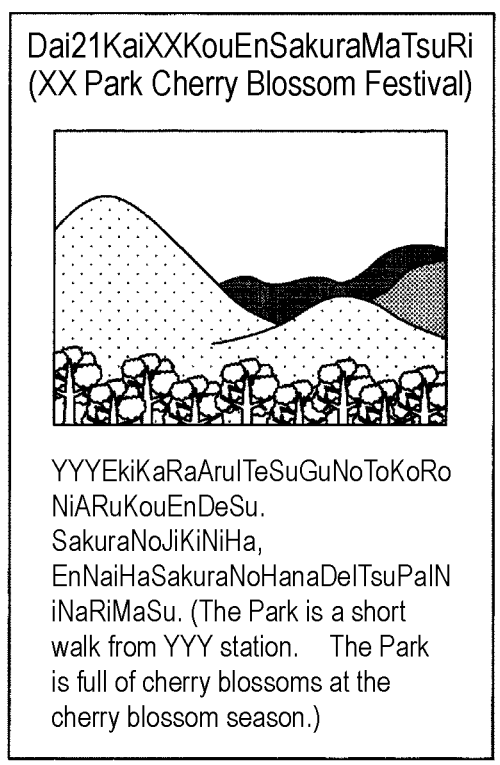
SECOND SCREEN

Fig. 21

| CONTENT | SYMBOL | VALUE |
|---|---|---|
| COEFFICIENT OF CONVERTING h1{font-size} INTO h1{char_height} | α1 | 1.2 |
| COEFFICIENT OF CONVERTING h1{font-size} INTO h1{char_width} | α2 | 1.1 |
| FONT SIZE OF TITLE | h1{font-size} | 80 |
| UPPER LIMIT NUMBER OF LINES OF TITLE | h1{max_line} | 3 |
| UPPER LIMIT NUMBER OF CHARACTERS PER LINE OF TITLE | h1{max_char} | 7 |
| MAXIMUM VALUE OF HEIGHT OF IMAGE AREA | img{max_height} | 500 |
| MAXIMUM VALUE OF LATERAL WIDTH OF IMAGE AREA | img{max_width} | 800 |
| LATERAL WIDTH OF OPTIONAL ELEMENT [1] | elem1{width} | 800 |
| FONT SIZE OF OPTIONAL ELEMENT [1] | elem1{font-size} | 50 |
| COEFFICIENT OF CONVERTING elem1{font-size} INTO elem1{char_height} | α11 | 1.2 |
| COEFFICIENT OF CONVERTING elem1{font-size} INTO elem1{char_width} | α12 | 1.5 |
| LATERAL WIDTH OF OPTIONAL ELEMENT [2] | elem2{width} | 800 |
| FONT SIZE OF OPTIONAL ELEMENT [2] | elem2{font-size} | 50 |
| COEFFICIENT OF CONVERTING elem2{font-size} INTO elem2{char_height} | α21 | 1.2 |
| COEFFICIENT OF CONVERTING elem2{font-size} INTO elem2{char_width} | α22 | 1.5 |
| LATERAL WIDTH OF OPTIONAL ELEMENT [3] | elem3{width} | 800 |
| FONT SIZE OF OPTIONAL ELEMENT [3] | elem3{font-size} | 30 |
| COEFFICIENT OF CONVERTING elem3{font-size} INTO elem3{char_height} | α31 | 1.4 |
| COEFFICIENT OF CONVERTING elem3{font-size} INTO elem3{char_width} | α32 | 1.2 |

Fig. 24

|  | h1[max_char] | | | | | |
|---|---|---|---|---|---|---|
| Dai | 21 | Kai | X | X | Shi | Min |
| Kou | En | Sa | Ku | Ra | MaTsu | Ri |
| Tai | Kai | Zen | Ya | Sai | | | h1[max_line] (left bracket), h1[char_height], h1[char_width]

(XX Civic Park Cherry Blossom Festival Pre-Festival Meeting)

Fig. 25

| X | X | Sa | Ku | Ra | Matsu | |
|---|---|---|---|---|---|---|
| (XX Cherry Blossom Festival) | | | | | | |
| | | | | | | |

Fig. 26
| Dai | 21 | Kai | X | X | Shi | Min |
|-----|----|----|---|---|-----|-----|
| Kou | En | Sa | Ku | Ra | MaTsuRi | ... |
(21-th XX Civic Park Cherry Blossom Festival
Pre-Festival Meeting...)
Fig. 27
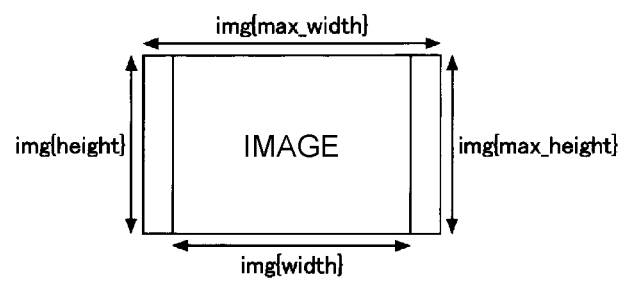
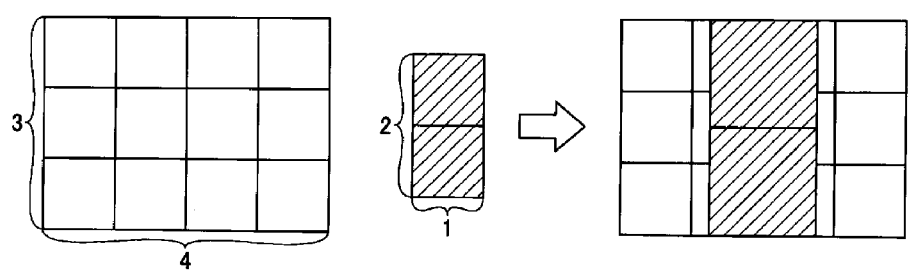

Fig. 28
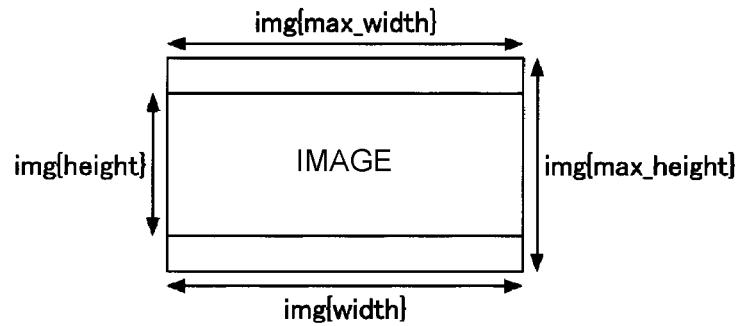
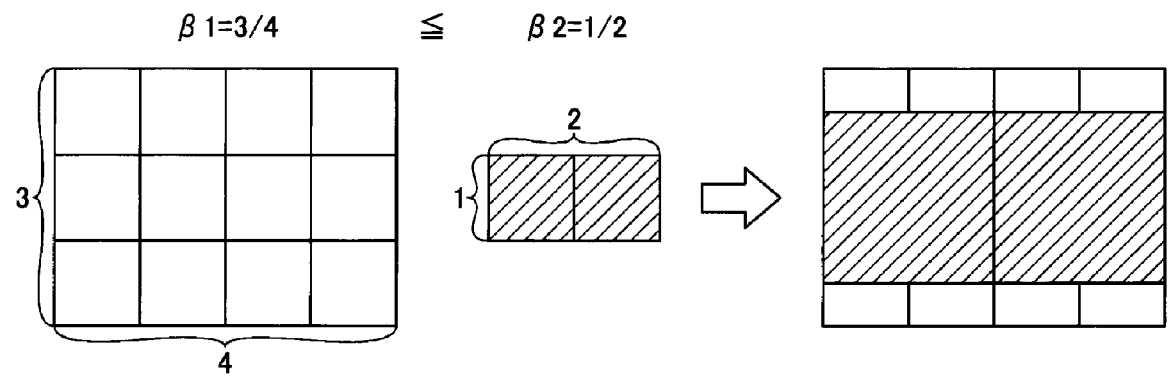
Fig. 29
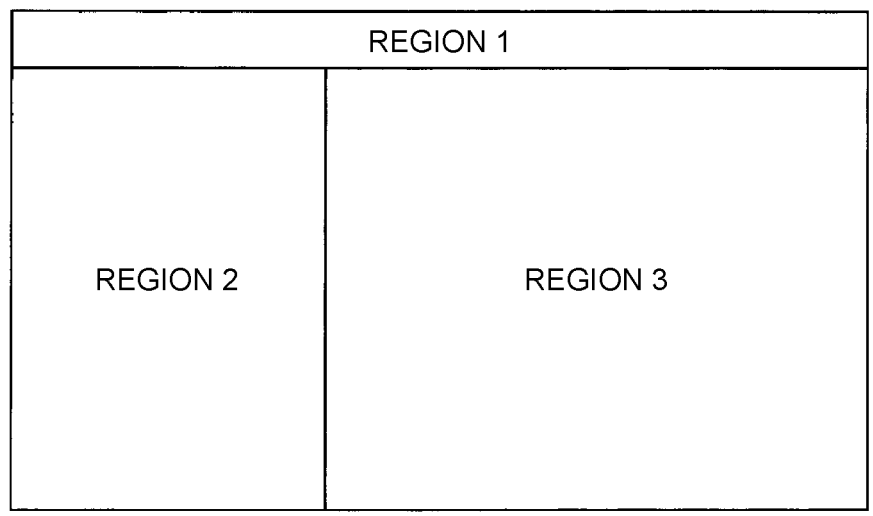

Fig. 30

| ARTICLE ELEMENT ITEM | DISPLAY REGION | COMMONLY DISPLAYED ON ALL SCREENS |
|---|---|---|
| TITLE | 1 | ○ |
| IMAGE | 3 | ○ |
| DATE AND TIME | 2 | ○ |
| PLACE | 2 | × |
| DESCRIPTION | 2 | × |

OUTPUT CONTENT GENERATION APPARATUS, OUTPUT CONTENT GENERATION METHOD AND PROGRAM

CROSS-REFERENCE TO RELATED APPLICATIONS

This application is a U.S. 371 Application of International Patent Application No. PCT/JP2019/036983, filed on 20 Sep. 2019, which application claims priority to and the benefit of JP Application No. 2018-189448, filed on 4 Oct. 2018, the disclosures of which are hereby incorporated herein by reference in their entireties.

TECHNICAL FIELD

The present invention relates to an output content generation device, an output content generation method, and a program.

BACKGROUND ART

When a user views web content (hereinafter simply called "content") using a browser in a PC, the user often performs operations using a mouse or a keyboard. When content cannot be fully displayed on a screen, scroll bars appear, and the user scrolls the screen using the mouse or the like, thereby allowing the entire content to be displayed on the screen and viewed. Furthermore, even when characters are small, an enlargement function of a browser is used to display the characters in an enlarged manner, which can be viewed. As described above, a creator of content for PCs can create the content regardless of the sizes of displays.

Also when content is displayed in digital signage, the browser is typically displayed at the maximum size and thus represented on the display. However, with digital signage that does not accept a user's inputs, such as scroll operations and enlargement operations, that is, noninteractive digital signage (hereinafter called "passive digital signage"), when not entire content is displayed, the user cannot apply a scroll operation to the screen, and not the entire content is viewable accordingly. Accordingly, to display the entire content, the entire content is required to be fit in one screen and displayed. Furthermore, since the user cannot enlarge or contract characters, the characters cannot be adjusted to the optimal size. Accordingly, it is difficult to understand the details of the content. Thus, all the characters of the content are required to be displayed in sizes viewable for people.

CITATION LIST

Non-Patent Literature

Non-Patent Literature 1: Nobuhiko Masui, Masaru Miyamoto, and Hideaki Ozawa: A Study of Information Display and Execution Method for Personal Digital Assistants, Information Processing Society of Japan Technical Reports, 2000-HI-91, pp. 25-30 (2000).

SUMMARY OF THE INVENTION

Technical Problem

There is responsive design, as a technique that reduces the details of content and displays the content on a small screen. This is a technique that can change elements and the layout to be displayed, according to the widths of screens. However, the responsive design is not a technique for fitting content in one screen. Accordingly, content is not fit in one screen and scroll bars are displayed in some cases. Accordingly, even if the responsive design is applied to content of passive digital signage, there is a possibility that content that cannot be displayed in one screen occurs in some cases. Furthermore, there is a problem in that style sheets are required to be created on a device-by-device basis, which requires time and effort to create content.

Typically, there are PowerPoint® and the like as tools for creating content to be displayed on digital signage. The slide creation software, such as PowerPoint®, can automatically contract characters such that pieces of writing can be fit in a certain region to fit content in one screen. However, characters are endlessly contracted. Accordingly, there is a possibility that characters having illegible sizes are displayed.

Note that web content has herein been described. However, problems as described above are not limited to those of web content.

The present invention has been made in view of the points described above, and has an object to allow information to be legibly viewable.

Means for Solving the Problem

To solve the above problem, an output content generation device, includes: a first calculation unit that calculates a size, in a display region of a display device, of each of pieces of information to be displayed in the display region; a determination unit that determines whether or not the pieces of information are arrangeable in the display region, based on the size of each of the pieces of information and a size of the display region; and a generation unit that allocates the pieces of information in a plurality of screens accommodated in the display region in a distributed manner, and generates output content of the pieces of information, when the pieces of information are not arrangeable in the display region.

Effects of the Invention

Information can be legibly viewable.

BRIEF DESCRIPTION OF DRAWINGS

FIG. 6 shows a configuration example of an article element item storage unit 121.

FIG. 7 shows a display example of an article registration screen (2/2).

FIG. 9 shows a configuration example of an article element table corresponding to "EVENT".

FIG. 10 shows an example where multiple records are registered in the article element table corresponding to "EVENT".

FIG. 13 shows an example of layout information.

FIG. 16 shows a configuration example of an element size storage unit 125.

FIG. 17 shows a configuration example of a layout setting storage unit 126.

FIG. 18 shows an example of an update result of a target layout setting table.

FIG. 19 shows an example of display results of a target article.

FIG. 21 shows a configuration example of a size parameter storage unit 124.

FIG. 24 shows an arrangement example of a second arrangement example of a title for a title area.

FIG. 25 shows an arrangement example of a third arrangement example of a title for a title area.

FIG. 26 shows an arrangement example of a fourth arrangement example of a title for a title area.

FIG. 27 shows an example of adjusting the size of an image in a case of $\beta1 \leq \beta2$.

FIG. 28 shows an example of adjusting the size of an image in a case of $\beta1 > \beta2$.

FIG. 29 shows an example of a display region divided into three regions.

FIG. 30 shows a configuration example of arrangement region setting data.

DESCRIPTION OF EMBODIMENTS

To fit content, such as web content, in one screen and display the content while keeping a certain degree of character size or more so as to make the characters legible for people, the display area has a certain limitation. If the number of characters of content increases, the content cannot be fit in one screen. Accordingly, in this embodiment, first, the content is adjusted to fit in one screen. If the content is not fit in one screen, the content is divided into multiple screens (distribution to multiple screens). Thus, in any case, that is, a case where the content is fit in one screen or a case where not fit therein, the content can be displayed on a screen with no need to scroll, while keeping a certain degree of character sizes or more. In this embodiment, description is made on web content. However, this embodiment may be applied to content other than web content.

Furthermore, in a case where content is displayed in a manner of being distributed in multiple screens, each screen is configured to be displayed for a time period sufficient for allowing a viewer to complete reading one screen. Accordingly, the possibility of switching the screen before the viewer finishes reading the screen can be reduced. In a case where the content is presented in the manner of being distributed in multiple screens, a certain piece of information on the configuration element of the content is commonly displayed at the same place, that is, the common piece of information is laid out for the added screen as with the first screen, thereby enhancing that each screen indicates information belonging to the same content, and reducing the load on the memory of the user.

First Embodiment

Figure 1:
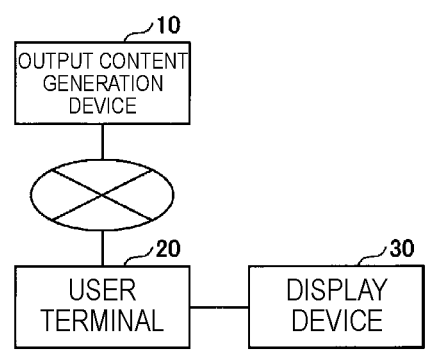
FIG. 1 shows a system configuration example in a first embodiment.

Hereinafter, referring to the drawings, embodiments of the present invention are described in further detail. FIG. 1 shows a system configuration example in a first embodiment. In FIG. 1, an output content generation device 10 is connected to a user terminal 20 via a network, such as the Internet. A display device 30 is connected to the user terminal 20 via, for example, an interface conforming to standards capable of transferring images, such as HDMI® (High-Definition Multimedia Interface).

The display device 30 is a device that displays image data transferred from the user terminal 20. In this embodiment, an example is described where the display device 30 is passive digital signage, and the details of the content include events of municipalities or the like, announcements, and information on sightseeing. However, the type of the display device 30 and the details of the content are not limited to specific ones. Hereinafter, for the sake of convenience, the content is called "article". Note that "passive digital signage" is digital signage that that does not accept the user's inputs, such as scroll operations and enlargement operations, that is, noninteractive digital signage.

The user terminal 20 is a terminal that accepts, from the user, pieces of information constituting an article, and an input of a generation request for article output content, and transmits input information, a request or the like to the output content generation device 10. The user terminal 20 includes a browser that displays output content generated about the article by the output content generation device 10. An image that indicates content to be displayed on the browser is output to the display device 30. For example, a PC (Personal Computer), a smartphone, a tablet terminal or the like may be used as the user terminal 20.

The output content generation device 10 is one or more computers that generate the article output content in a legible manner for a viewer of the article. The output content is display data that includes, for example, files such as of html, css, and Javascript®.

Figure 2:
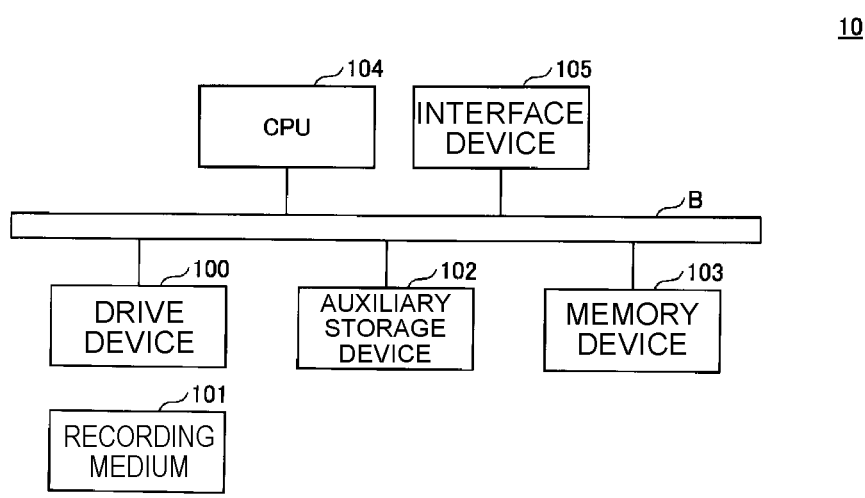
FIG. 2 shows a hardware configuration example of an output content generation device 10 in the first embodiment.

FIG. 2 shows a hardware configuration example of the output content generation device 10 in the first embodiment. The output content generation device 10 in FIG. 1 includes a drive device 100, an auxiliary storage device 102, a memory device 103, a CPU 104, and an interface device 105, which are connected to each other by a bus B.

A program of achieving processes in the output content generation device 10 are provided through a recording medium 101, such as a CD-ROM. After the recording medium 101 that stores the program is set in the drive device 100, the program is installed from the recording medium 101 through the drive device 100. However, installation of the program is not necessarily performed through the recording medium 101, and may be downloaded from another computer via the network instead. The auxiliary storage device 102 stores the installed program, and also stores required files, data and the like.

When an instruction for activating the program is issued, the memory device 103 reads the program from the auxiliary storage device 102 and stores the program. The CPU 104 executes a function pertaining to the output content generation device 10, according to the program stored in the memory device 103. The interface device 105 is used as an interface for connection to the network.

Figure 3:
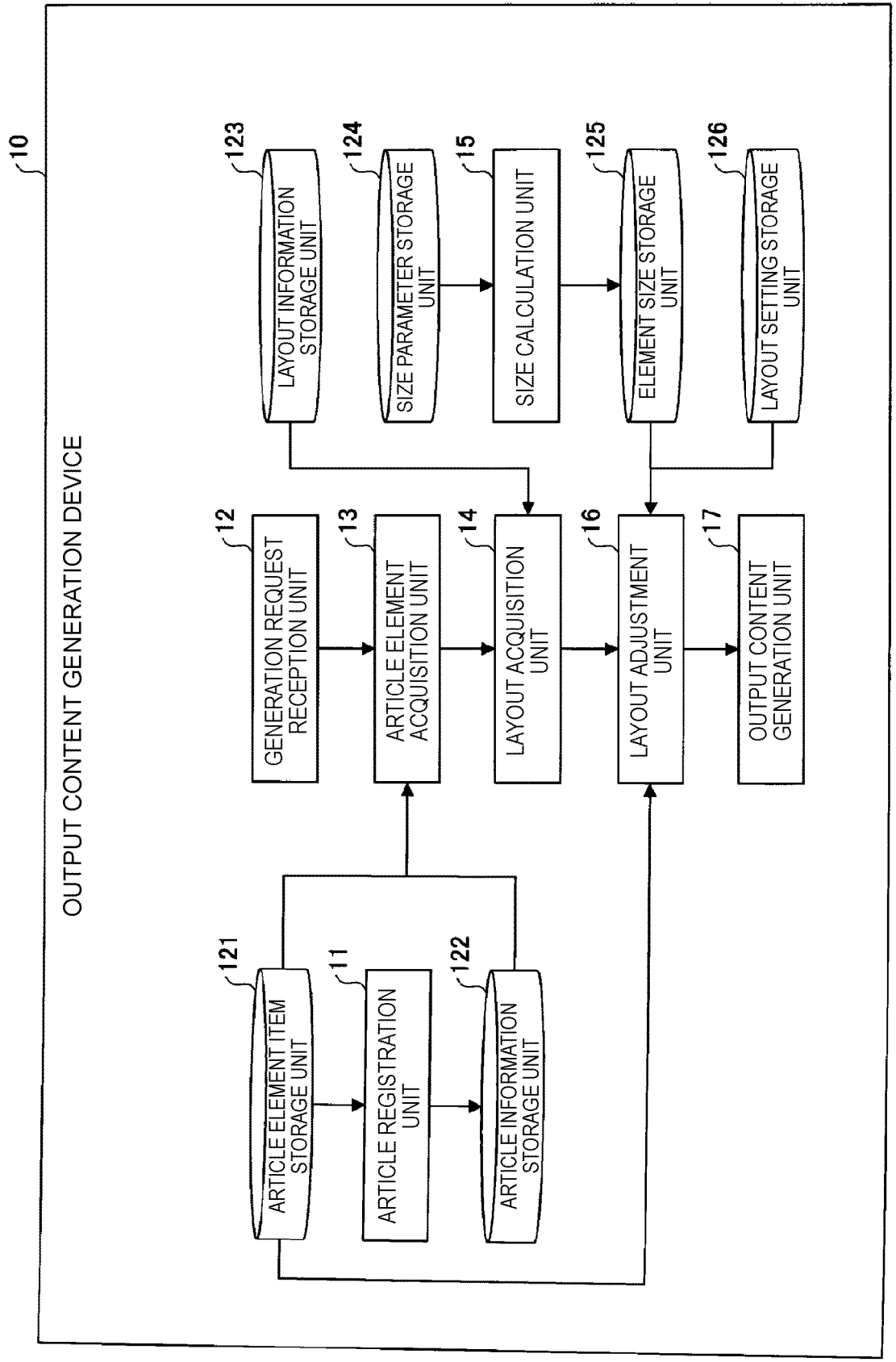
FIG. 3 shows a functional configuration example of the output content generation device 10 in the first embodiment.

FIG. 3 shows a functional configuration example of the output content generation device 10 in the first embodiment. In FIG. 3, the output content generation device 10 includes an article registration unit 11, a generation request reception unit 12, an article element acquisition unit 13, a layout acquisition unit 14, a size calculation unit 15, a layout adjustment unit 16, and an output content generation unit 17. These units are achieved by processes that one or more programs installed in the output content generation device 10 cause the CPU 104 to execute. The output content generation device 10 uses an article element item storage unit 121, an article information storage unit 122, a layout information storage unit 123, a size parameter storage unit 124, an element size storage unit 125, a layout setting storage unit 126 and the like. These storage units can be achieved using the auxiliary storage device 102, or using a storage device or the like connectable to the output content generation device 10 via the network, for example.

Figure 4:
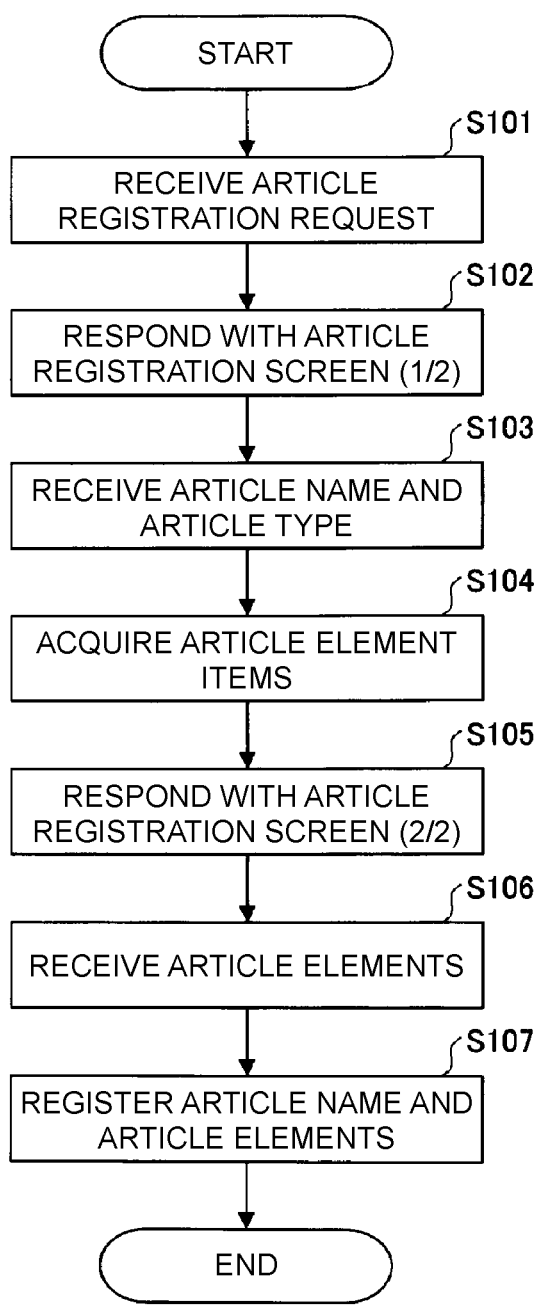
FIG. 4 is a flowchart for illustrating an example of processing procedures of an article registration process.

Hereinafter, processing procedures executed by the output content generation device 10 are described. FIG. 4 is a flowchart for illustrating an example of the processing procedures of an article registration process. Hereinafter, an example is described where a user, such as a local official, registers an article pertaining to an event, an announcement or sightseeing.

When the URL (Uniform Resource Locator) of an article registration page is input using the browser displayed on the user terminal 20, the user terminal 20 transmits an HTTP request (hereinafter called "article registration request") to the article registration unit 11 of the output content generation device 10.

In step S101, upon receipt of the article registration request, the article registration unit 11 generates display data (html or the like) pertaining to an article registration screen (1/2), and transmits a response including the display data to the user terminal 20 (S102). The browser of the user terminal 20 displays the article registration screen (1/2) on the basis of the display data. The article registration screen (1/2) is displayed on a liquid crystal display or the like that is other than the display device 30 and is included in the user terminal 20. The article registration screen (1/2) is a first screen between two screens related to article registration.

Figure 5:
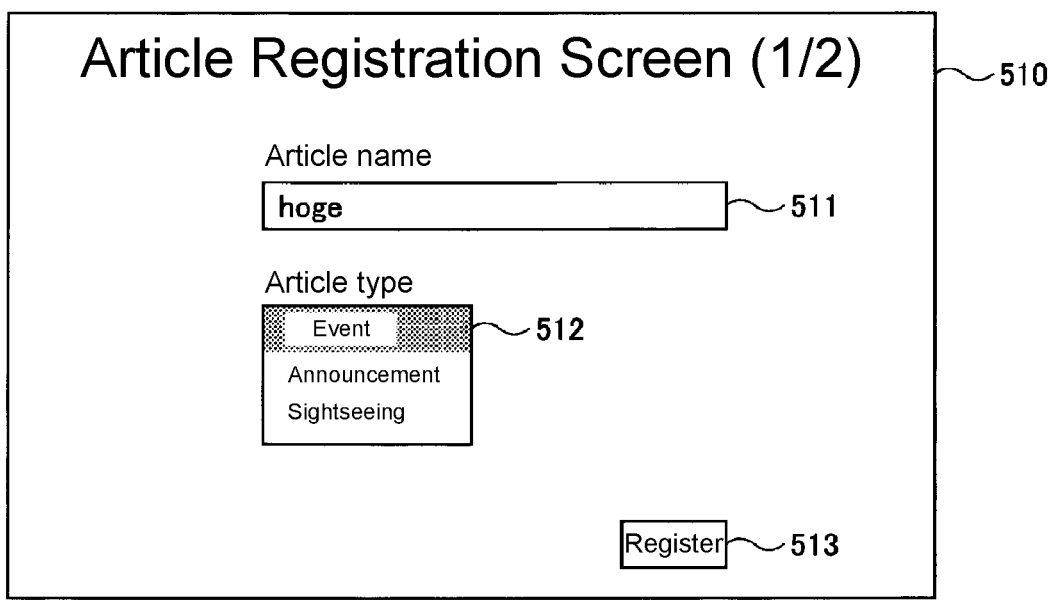
FIG. 5 shows a display example of an article registration screen (1/2).

FIG. 5 shows a display example of the article registration screen (1/2). In FIG. 5, the article registration screen (1/2) 510 includes an article name input region 511, an article type selection region 512, and a registration button 513. The article name input region 511 is a region for accepting an input of a name unique to the article as a registration target (hereinafter called "article name"). The article type selection region 512 is a region for accepting selection of the article type. The article type as an alternative is preliminarily displayed therein. The article type is the type of an article. In this embodiment, the type of the article is discriminated according to element items constituting the article (hereinafter called "article element item"). The article element items correspond to pieces of information constituting the article (i.e., pieces of information to be displayed on the display device 30). As shown in FIG. 5, in this embodiment, any article type among "EVENT", "announcement" and "sightseeing" can be selected. As clearly understood by the following description, these article types can be identified with reference to the article element item storage unit 121. That is, the article registration unit 11 identifies the article type selectable with reference to the article element item storage unit 121, and generates display data on the article registration screen (1/2) 510 such that the identified article type can serve as an alternative. Note that the user may directly input the article type. The article name and the article type are independent of each other. The article name should be unique (redundant article names are not permitted). In this embodiment, the example where the user inputs the article name is described. Alternatively, for example, the article name may be automatically generated afterward by the output content generation device 10, for example.

After the article name is input and the article type is selected by the user and subsequently the registration button 513 is pressed, the user terminal 20 transmits the article name and the article type to the output content generation device 10. FIG. 5 shows an example where "hoge" is input as the article name, and "EVENT" is selected as the article type. Hereinafter, the input article name is called "target article name", and the selected article type is called "target article type".

In step S103, the article registration unit 11 receives the target article name and the target article type. Subsequently, the article registration unit 11 acquires the article element items corresponding to the target article type, from the article element item storage unit 121 (S104).

FIG. 6 shows a configuration example of the article element item storage unit 121. As shown in FIG. 6, article element items are stored with respect to each article type, in the article element item storage unit 121. Specifically, the article element items of the article type "EVENT" are "TITLE", "IMAGE", "DATE AND TIME", "PLACE" and "DESCRIPTION". The article element items of the article type "ANNOUNCEMENT" are "TITLE", "IMAGE", "ANNOUNCEMENT TYPE", "DESCRIPTION" and "CONTACT". The article element items of the article type "SIGHTSEEING" are "TITLE", "IMAGE", "PLACE", "SIGHT" and "DESCRIPTION". Specific article element items of each article type are stored in the preset article element item storage unit 121.

FIG. 6 shows the example where the numbers of article element items of all the article types are the same. Alternatively, the number of article element items may vary according to the article type. In this embodiment, for the sake of convenience of description, the article name is not regarded as an article element item. The article name is information that is information for identifying each article, but is not information to be displayed.

In the example of FIG. 6, if the target article type is "EVENT", then "TITLE", "IMAGE", "DATE AND TIME", "PLACE" and "DESCRIPTION" are acquired as article element items in step S104.

Subsequently, the article registration unit 11 generates display data on an article registration screen (2/2) so as to be capable of receiving information or values for the acquired article element items (hereinafter called "article elements"), and transmits a response including the display data to the user terminal 20 (S105). The browser of the user terminal 20 displays the article registration screen (2/2) on the basis of the display data. The article registration screen (2/2) is displayed on the liquid crystal display or the like that is other than the display device 30 and is included in the user terminal 20. The article registration screen (2/2) is a second screen between two screens related to article registration.

FIG. 7 shows a display example of the article registration screen (2/2). FIG. 7 shows the display example of the article registration screen (2/2) 520 in a case where the target article type is "EVENT". Consequently, the article registration screen (2/2) 520 includes input regions respectively corresponding to "TITLE", "IMAGE", "DATE AND TIME", "PLACE" and "DESCRIPTION" that are the article element items corresponding to the "EVENT". Among them, the values (article elements) of "TITLE", "DATE AND TIME", "PLACE" and "DESCRIPTION" are character strings. Accordingly, character strings are input directly into the corresponding input regions. On the other hand, as for "image", for example, when an image file is selected from a file system or the like of the user terminal 20, the file name of the image file is displayed in the corresponding input region.

Figure 8:
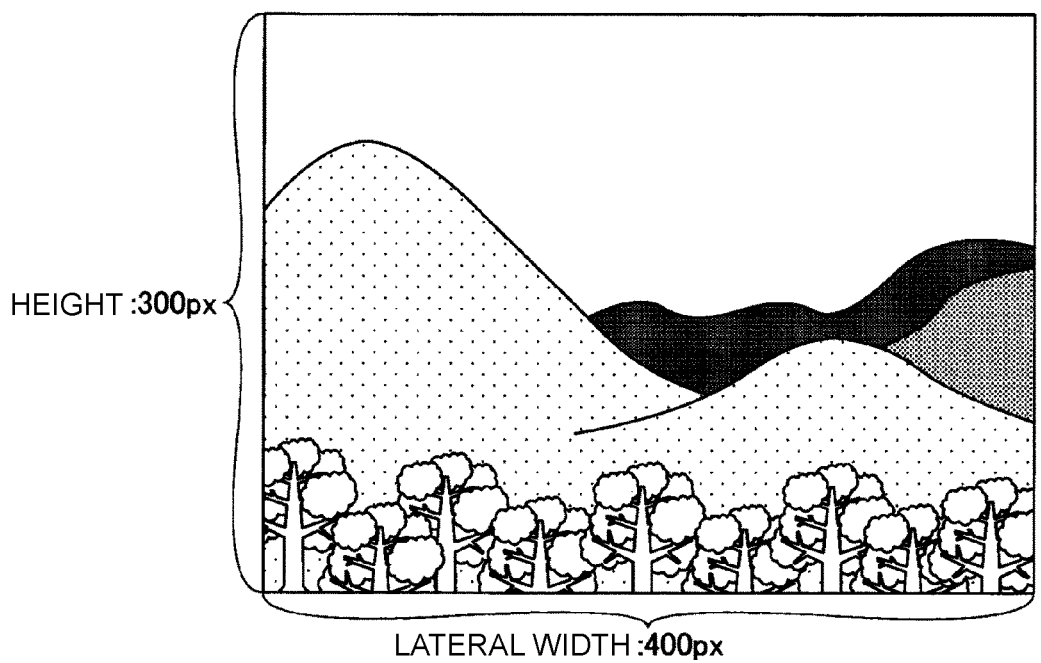
FIG. 8 shows an example of image data.

The example of FIG. 7 shows an example where "Dai21KaiXXKouEnSaKuRaMatsuRi" (21-th XX Park Cherry Blossom Festival) is input in "TITLE", "NichiJi: 2018Nen3Gatsu18Nichi" (Date and time: Mar. 18, 2018) is input in "date and time", "KaiJou:XXKouEn" (Venue: XX Park) is input in "PLACE", and "YYYEkiKaRaAruITeSuGuNoToKoRoNiARuKouEnDeSu. SakuraNoJiKiNiHa, EnNaiHaSakuraNoHanaDeITsuPaINiNaRiMaSu." (The Park is a short walk from YYY station. The Park is full of cherry blossoms at the cherry blossom season) is input in "DESCRIPTION". In the thus shown example, for "IMAGE", the image file with a file name "hanami.jpg" is selected. The image data stored in the image file is, for example, image data as shown in FIG. 8.

After the article elements are input in the respective article element items and a registration button 521 is pressed, the user terminal 20 transmits the input article elements to the output content generation device 10. As for "IMAGE", the file name and the image file are transmitted as the article elements.

In step S106, the article registration unit 11 receives the article elements. Subsequently, the article registration unit 11 registers (stores) these article elements in association with the target article name, in the article element table corresponding to the target article type among the tables generated for the corresponding article types (hereinafter called "article element table"), in the article information storage unit 122 (S107).

FIG. 9 shows a configuration example of an article element table corresponding to "EVENT". As shown in FIG. 9, the article element table T1 corresponding to "EVENT" includes records that can store article elements of the article element items of "ARTICLE NAME" and "EVENT", for each article. After "EVENT" is selected as the article type and the processing procedures in FIG. 4 are executed multiple times, multiple records are stored in the article element table T1, for example, as shown in FIG. 10.

Figure 11:
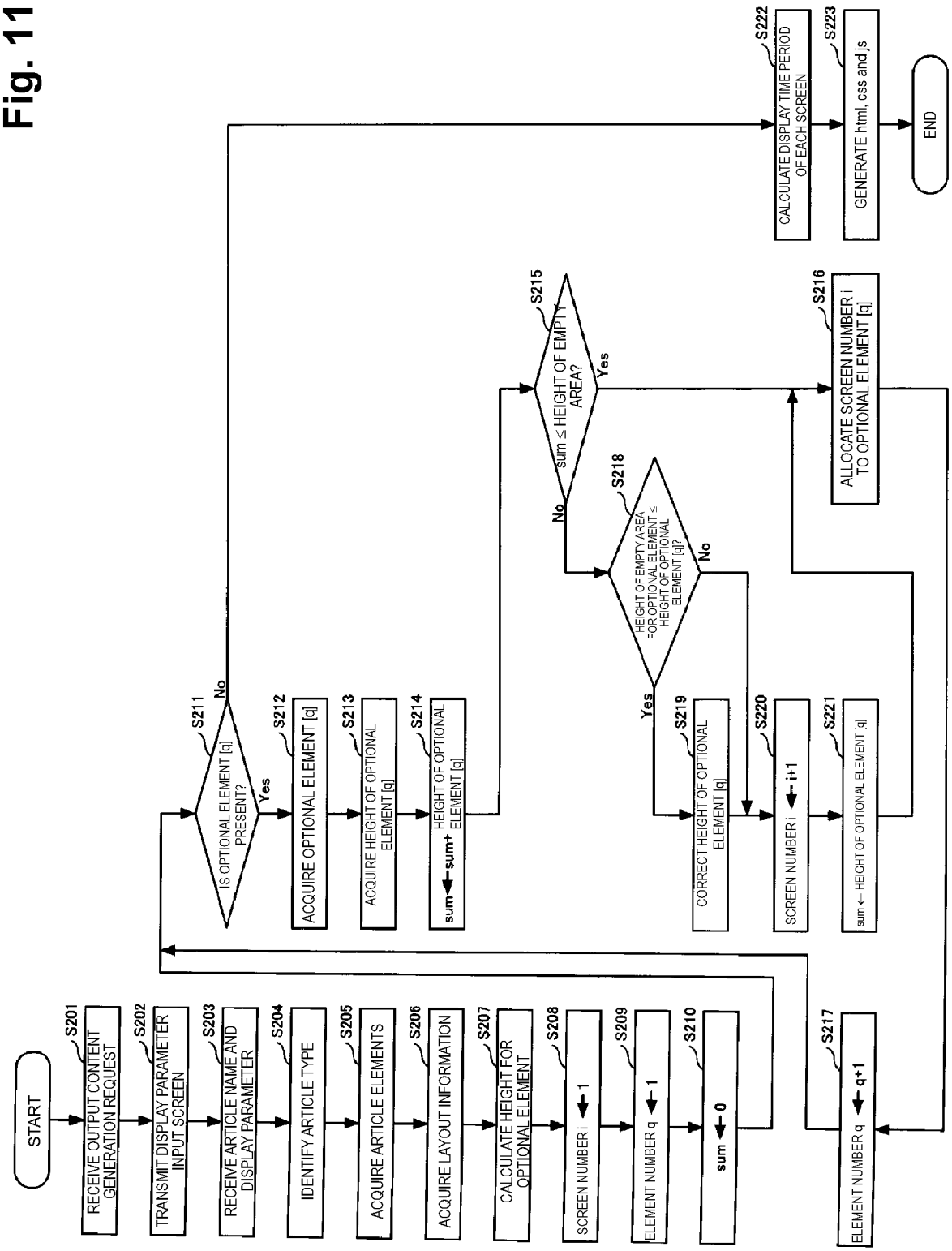
FIG. 11 is a flowchart for illustrating an example of processing procedures of a process of generating article output content.

Subsequently, a process of generating the article output content of the article registered in the aforementioned manner is described. FIG. 11 is a flowchart for illustrating an example of processing procedures of the process of generating article output content.

After the URL of generating the output content is input using a browser displayed on the user terminal 20, the user terminal 20 transmits an HTTP request (hereinafter called "output content generation request") to the generation request reception unit 12 of the output content generation device 10.

In step S201, upon receipt of the output content generation request, the generation request reception unit 12 generates display data (HTML etc.) pertaining to the display parameter input screen, and transmits a response including the display data to the user terminal 20 (S202).

Figure 12:
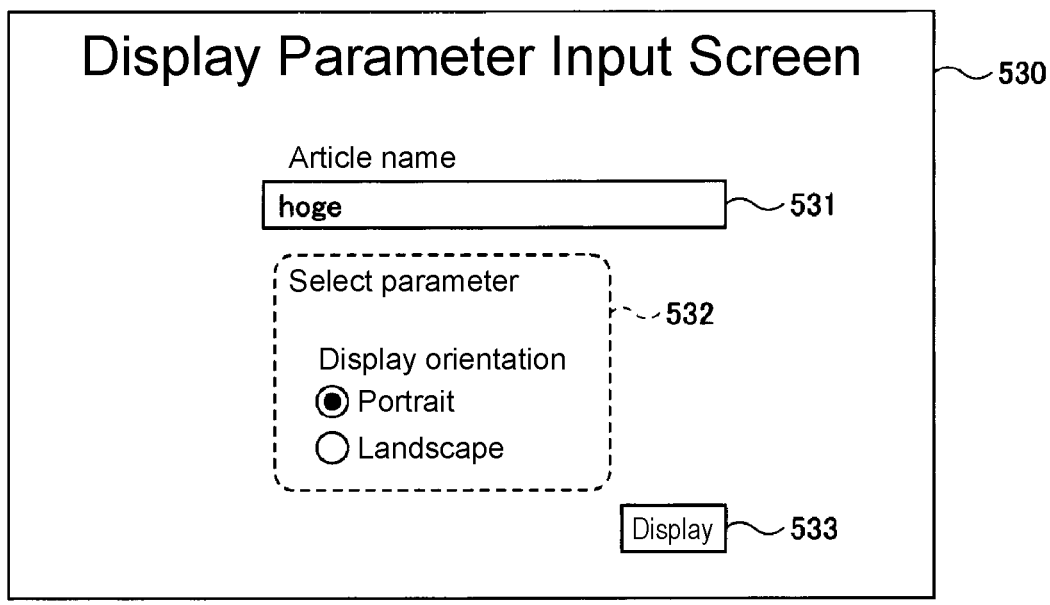
FIG. 12 shows a display example of a display parameter input screen.

FIG. 12 shows a display example of the display parameter input screen. In FIG. 12, the display parameter input screen 530 includes an article name input region 531, a display parameter selection region 532, and a display button 533.

The article name input region 531 is a region for accepting an input of the article name of an article (hereinafter called "target article") serving as a generation target (i.e., a display target) of output content. The display parameter selection region 532 is a region for accepting selection of a display parameter resulting in the mode of output content. In this embodiment, an example is described where the orientation of the display of the display device 30 is this display parameter. Note that a display parameter other than the orientation of the display may be allowed to be input. For example, display parameters, such as necessity of translation of the article element in cooperation with an external API (Application Program Interface), and necessity of converting the color combination of the article elements for people with color vision defects, may be allowed to be input. This means that possible selection of "necessary" for these display parameters converts the article element of the target article according to the display parameters at the time of display.

When the article name is input, the value of the display parameter (display orientation) is selected, and the display button 533 is pressed, the user terminal 20 transmits the input article name (hereinafter called "target article name") and the value of the selected display parameter (hereinafter called "target display parameter value") to the output content generation device 10. FIG. 12 shows an example where the target article name is "hoge" and the target display parameter value "Portrait".

In step S203, upon receipt of the target article name and the target display parameter value, the generation request reception unit 12 inputs the target article name and the target display parameter value into the article element acquisition unit 13.

Subsequently, the article element acquisition unit 13 identifies the article type corresponding to the input target article name (hereinafter called "target article type") (S204). Specifically, the article element acquisition unit 13 searches each article element table (FIG. 10) stored, with respect to each article type, in the article information storage unit 122, for a record that includes the target article name. The article element acquisition unit 13 identifies, as the target article type, an article type corresponding to the article element table searched for the record including the target article name (hereinafter called "target article element record"). If the target article name is "hoge", the article type to which the article element table T1 including the target article name "hoge" corresponds is "EVENT", as shown in FIG. 10. Consequently, the target article type is identified as "EVENT".

Subsequently, the article element acquisition unit 13 acquires multiple article elements corresponding to the target article name (hereinafter called "target article element group") from the target article element record (S205). In FIG. 10, an article element group of "Dai21- KaiXXKouEnSaKuRaMatsuRi" (21-th XX Park Cherry Blossom Festival), "hanami.jpg", "NichiJi:2018Nen3Gatsu18Nichi" (Date and time: Mar. 18, 2018), "KaiJou:XXKouEn" (Venue: XX Park), "YYYEkiKaRaAruITeSuGuNoToKoRoNiARuKouEnDeSu. SakuraNoJiKiNiHa, EnNaiHaSakuraNoHanaDeITsuPaINiNaRiMaSu." (The Park is a short walk from YYY station. The Park is full of cherry blossoms at the cherry blossom season), is acquired as a target article element group from the record that includes the target article name "hoge". These article elements are an example of pieces of information to be displayed on the display device 30.

The article element acquisition unit 13 inputs the target article name, the target display parameter value, the target article type, and the target article element group, into the layout acquisition unit 14.

Subsequently, the layout acquisition unit 14 acquires, from the layout information storage unit 123, a copy of the layout information corresponding to the input target article type and target display parameter value (S206). That is, the layout information is stored with respect to each combination of the article type and the display parameter (portrait or landscape), in the layout information storage unit 123.

FIG. 13 shows an example of the layout information. As shown in FIG. 13, the layout information is information that includes files of html, css, Javascript® and the like, or a script for outputting these files, and is information serving as a template of the article output content. That is, by applying information (target article element group or the like) unique to the target article, to these files, the target article output content is generated. Note that the layout information may include a calculation formula of calculating the display time period for each screen in a case where the target article is divided into multiple screens by a process described later, and setting that is setting or the like of whether display is performed on multiple screens or not.

Figure 14:
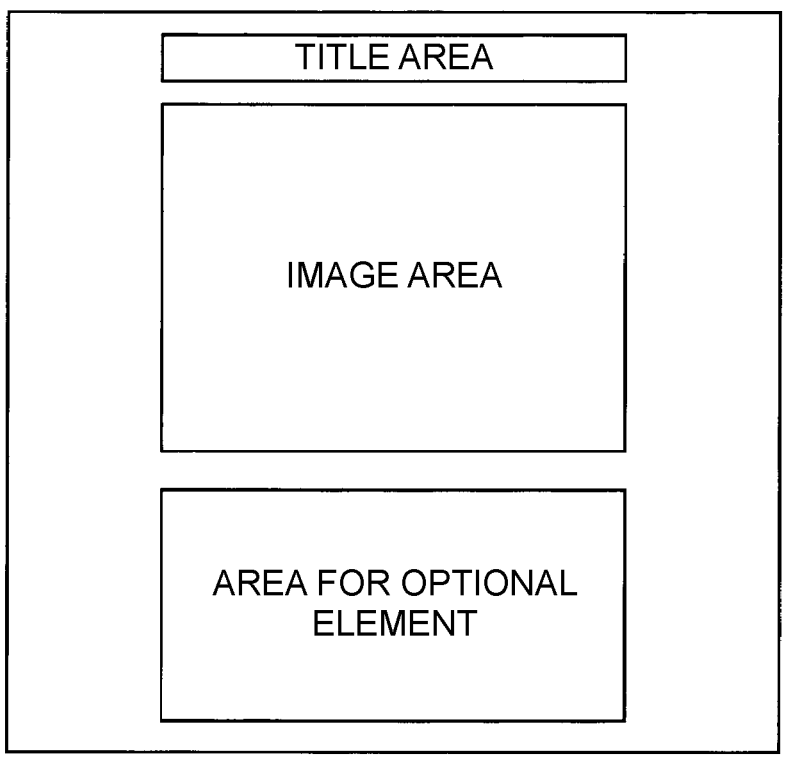
FIG. 14 shows an example of a layout defined in the layout information.

The layout information in FIG. 13 is layout information in a case where the article type is "EVENT" and the display parameter value (value of display orientation) is "Portrait", and is defined so as to display the target article in a layout as shown in FIG. 14.

FIG. 14 shows an example of a layout defined in the layout information. FIG. 14 shows the example where the title area, the image area, and an area for an optional element (hereinafter simply called "area" if these are not discriminated from each other) are arranged sequentially in the vertical direction. The title area, the image area, and the area for an optional element sequentially correspond to an html element e1, an html element e2, and an html element e3 of "*.html" in FIG. 13**.

The title area is an area where "TITLE" is arranged. The "IMAGE AREA" is an area where "IMAGE" is displayed. The area for an optional element is an area where "DATE AND TIME", "PLACE" and "DESCRIPTION" are arranged. Hereinafter, an article element arranged in the area for an optional element is called "optional element", and the optional element arranged at the q-th place in the area for an optional element is represented as "optional element [q]".

The types and number of optional elements vary according to the article type. If the article type is "EVENT", an optional element [1] is "DATE AND TIME", an optional element [2] is "PLACE" and an optional element [3] is "DESCRIPTION" as shown in FIG. 6. If the article type is "ANNOUNCEMENT", an optional element [1] is "ANNOUNCEMENT TYPE", an optional element [2] is "DESCRIPTION" and an optional element [3] is "CONTACT" as shown in FIG. 6. If the article type is "SIGHTSEEING", an optional element [1] is "PLACE", an optional element [2] is "SIGHT" and an optional element [3] is "DESCRIPTION" as shown in FIG. 6.

As described above, the article element item varies according to the article type. The optional element is determined in conformity with the article element item. In this embodiment, the case of three optional elements are described. However, the number of optional elements is determined according to the definition of the article element items.

The layout acquisition unit 14 inputs, into the layout adjustment unit 16, not only the target article name, the target display parameter value, the target article type and the target article element group, which have been input from the article element acquisition unit 13, but also the copy of the layout information acquired in step S206 (hereinafter called "target layout information").

Subsequently, the layout adjustment unit 16 calculates the size of an area for an optional element that can be secured when the target article is displayed in the display region of the display of the display device 30 (S207). Here, as shown in FIG. 14, the areas are arranged in the vertical direction. Accordingly, an example where the height is calculated as the size is described. If the target display parameter value is "Landscape", the layout is preliminarily set for each target display parameter value, as described in a second embodiment. In another example of layout setting where the target display parameter value is "Landscape" and each area is arranged in the horizontal direction, "HEIGHT" in the following description may be set to be replaced with "WIDTH".

Figure 15:
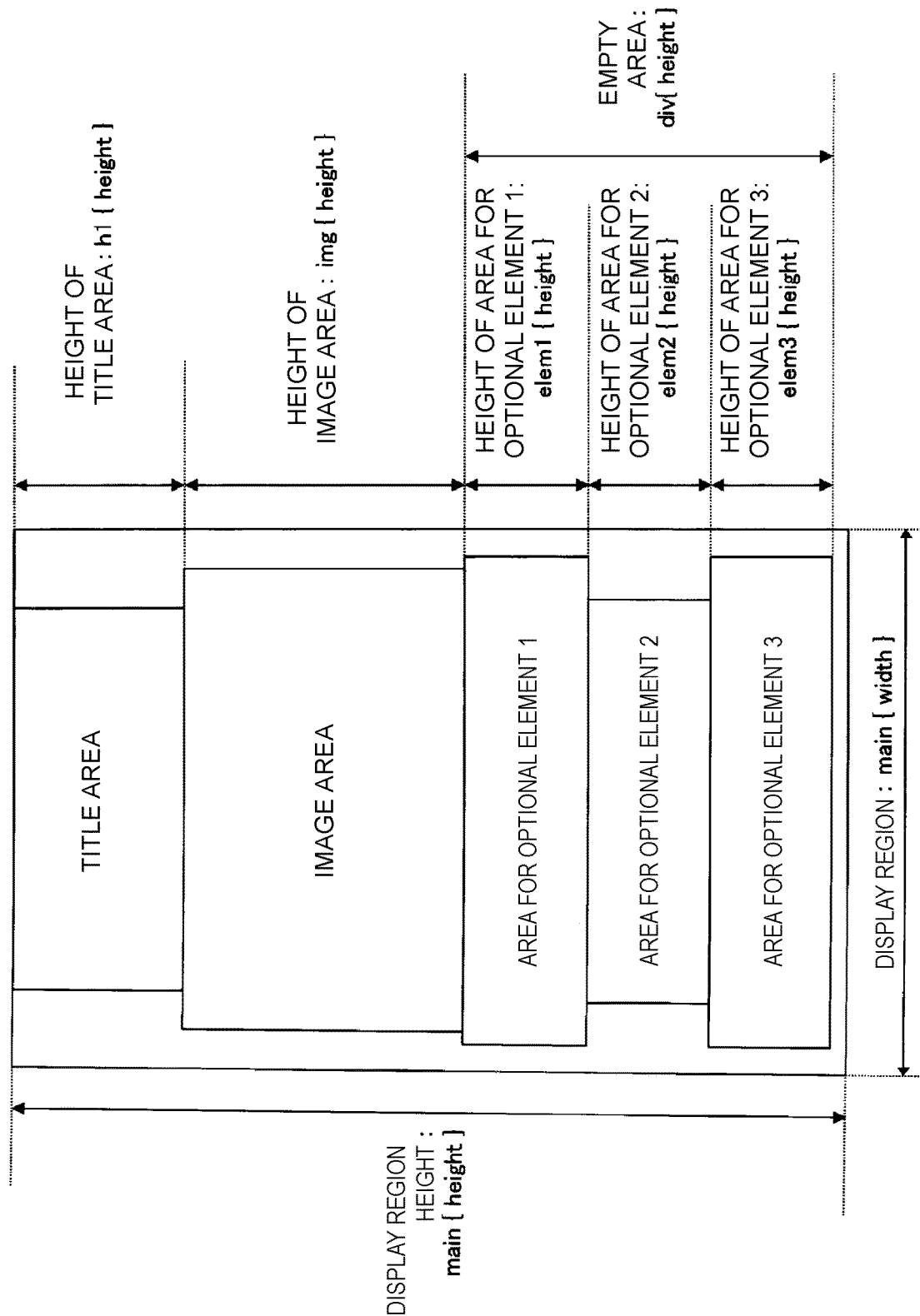
FIG. 15 is a diagram for illustrating an idea of a method of calculating the heights of areas for optional elements.

Here, an idea of a method of calculating the sizes (heights) of the areas for optional elements is described. FIG. 15 is a diagram for illustrating the idea of the method of calculating the heights of areas for optional elements.

According to the layout shown in FIG. 14, "TITLE AREA", "IMAGE AREA", "AREA FOR OPTIONAL ELEMENT [1]", "AREA FOR OPTIONAL ELEMENT [2]" and "AREA FOR OPTIONAL ELEMENT [3]" are arranged from the top in order in the vertical direction as shown in FIG. 15. Accordingly, by subtracting the heights of the "TITLE AREA" and "IMAGE AREA" from the height of the display region of the display of the display device 30, an area reserved for the optional element [1], the optional element [2], and the optional element [3] (hereinafter called "empty area") can be calculated. The height of the empty area is adopted as div{height}.

As shown in FIG. 15, the height of the display region is assumed as main{height}, the lateral width of the display region is assumed as main{width}, the height of "TITLE AREA" is assumed as h1{height}, the height of "IMAGE AREA" is assumed as img{height}, the height of "AREA FOR OPTIONAL ELEMENT [1]" is assumed as elem1{height}, the height of "AREA FOR OPTIONAL ELEMENT [2]" is assumed as elem2{height}, and the height of "AREA FOR OPTIONAL ELEMENT [3]" is assumed as elem3{height}.

Here, main{height} and main{width} are preliminarily stored in the auxiliary storage device 102 or the like. It is herein assumed that main{height}=1920 px, and main{width}=1080 px.

The size (height) of the article element corresponding to each area is calculated according to a method described later by this time point (the time point when step S207 is executed), and is stored in the element size storage unit 125 on an article-by-article basis.

FIG. 16 shows a configuration example of the element size storage unit 125. FIG. 16 shows the height of each article element of the article having an article name "hoge". According to FIG. 16, the height of each area shown in FIG. 15 is as follows.

$h1\{height\}=492(px)$ $img\{height\}=900(px)$ elem1{height}=260(px)

elem2{height}=260(px)

elem3{height}=344(px)

Consequently, the height of the empty area can be calculated as follows.

$$div\{height\} = main\{height\} - h1\{height\} - img\{height\}$$
$$= 1920 - 492 - 900$$
$$= 528\ (px)$$

Note that the method of calculating each article element shown in FIG. 16 is described later. If the target article type is "EVENT", "TITLE AREA", "AREA FOR OPTIONAL ELEMENT [1]", "AREA FOR OPTIONAL ELEMENT [2]" and "AREA FOR OPTIONAL ELEMENT [3]" are areas where texts (character strings) are entered. The sizes of the areas vary according to the font size and the number of characters. The "IMAGE AREA" is an area where an image is entered. The size of area varies according to the size of the image.

In and after step S208, the layout adjustment unit 16 identifies optional elements that can be fit in one screen (display region). If not all the optional elements can be fit in one screen, a process of arranging the target article element group in a manner distributed in multiple screens is executed. That is, for the sake of convenience, FIG. 15 shows a state where all three optional elements are fit in the height of the display region. According to the size of the area corresponding to each article element, not all the optional elements are not necessarily fit in one screen.

In step S208, the layout adjustment unit 16 substitutes one, which is an initial value, for the screen number i. The screen number i is the number of screen constituting the target article. Subsequently, the layout adjustment unit 16 substitutes one, which is an initial value, in an element number q that is a number for identifying the article element serving as a processing target (S209). Subsequently, the layout adjustment unit 16 substitutes zero, which is an initial value, in the threshold "sum" for determining the necessity of screen division (distribution of the target article element group). The threshold "sum" is a variable for storing the cumulative total of heights of optional elements. On the basis of the cumulative total of the heights of optional elements, it is possible to determine whether the optional elements are fit in the empty area or not. In "sum", the heights of optional elements are added up in the order of arrangement.

Subsequently, the layout adjustment unit 16 determines whether the optional element [q] corresponding to the element number q is present or not (S211). If q=1, the presence of the optional element [1] is determined. Here, the element number q indicates the number of the optional element. Cases where q=1, 2 and 3 for the optional element [q] indicate the optional element [1], the optional element [2] and the optional element [3], respectively. Determination in step S211 may be performed by referring to the article element items stored in the article element item storage unit 121 (FIG. 6) in association with the target article types. If the target article type is "EVENT", "DATE AND TIME" corresponding to the optional element [1] is present, with reference to FIG. 6. Consequently, in this case, the processing proceeds to step S212.

In step S212, the layout adjustment unit 16 acquires the article element (optional element) corresponding to the optional element [q] from the target article element group input from the layout acquisition unit 14. If q=1, "NichiJi: 2018Nen3Gatsu18Nichi" (Date and time: Mar. 18, 2018) is acquired. Subsequently, the layout adjustment unit 16 acquires the height of the optional element [q] from the element size storage unit 125 (FIG. 16) (S213). If q=1, elem1{height}=260 (px), which is the height of "DATE AND TIME" is acquired.

Subsequently, the layout adjustment unit 16 adds the height of the optional element [q] to the threshold "sum" (S214). If q=1, "sum" is updated as follows.

sum=0+elem1{height}=elem1{height}=260(px)

Subsequently, the layout adjustment unit 16 compares the value of the threshold "sum" with the height of the empty area div{height} (S215). That is, if the value of the threshold "sum" is equal to or less than div{height} that is the height of "empty area" calculated in S207, it can be determined that the optional element [q] is fit in the screen with the screen number=i. If q=1, sum=elem1{height}=260 div{height}=528

Accordingly, elem1{height}≤div{height}. Consequently, in this case (Yes in S215), the layout adjustment unit 16 allocates the optional element [q] to the screen corresponding to the screen number i (S216). The result of allocation is reflected in the layout setting storage unit 126. That is, the optional element [1] is allocated to the screen number 1.

FIG. 17 shows a configuration example of the layout setting storage unit 126. As shown in FIG. 17, the layout setting storage unit 126 stores a layout setting table, with respect to each combination of the article type and the display parameter (display orientation). A layout setting table T2 shown in FIG. 17 indicates a layout setting table corresponding to the target article type ("EVENT") and the target display parameter value ("Portrait"). Consequently, the layout setting table T2 includes a record for each article element item of "EVENT". Each record includes items that are "LAYOUT IN AREA", "AREA LAYOUT", "COMMONLY DISPLAYED ON ALL SCREENS" and "TARGET SCREEN".

"LAYOUT IN AREA" is an item indicating the arrangement position of the article element in the horizontal direction in the area to which the article element item corresponds. In the example of FIG. 17, "TITLE" is set as "CENTERED" in the title area, "IMAGE" is set as "CENTERED" in the image area, "DATE AND TIME" is set as "LEFT-ALIGNED" in the area for the optional element 1, "PLACE" is "LEFT-ALIGNED" in the area for the optional element 2, and "DESCRIPTION" is set as "LEFT-ALIGNED" in the area for the optional element 3.

"AREA LAYOUT" is an item indicating the arrangement position of the area itself to which the article element item corresponds in the horizontal direction, with respect to the display region. In the example of FIG. 17, all the areas (the title area, the image area, the area for the optional element 1, the area for the optional element 2, and the area for the optional element 3) are set as "CENTERED". Note that the setting is reflected in FIG. 15. That is, in FIG. 15, each area is centered.

"COMMONLY DISPLAYED ON ALL SCREENS" is an item indicating whether each article element is displayed on all the screens or not when the article element group is distributed to the screens. In the example of FIG. 17, "TITLE" and "IMAGE" have "COMMONLY DISPLAYED ON ALL SCREENS" of "TRUE". The other items have that of "FALSE". If the article element group is displayed in a manner distributed to multiple screens, "TITLE" and "IMAGE" are commonly displayed on all the screens, and the other article element items are displayed only on screens to which the respective article element items are allocated.

"TARGET SCREEN" is an item of indicating the screen to which the corresponding article element is allocated (the screen to be displayed). In the example of FIG. 17, "TITLE" and "IMAGE" are commonly displayed on all the screens. Accordingly, these items are "ALL SCREENS". The other article elements (i.e., optional elements) vary according to specific articles. Accordingly, no setting is preliminarily made. Note that in FIG. 15, the items other than the title and the image are optional elements. This means that items with the field of COMMONLY DISPLAYED ON ALL SCREENS being FALSE in the setting in FIG. 17 are regarded as optional elements.

Accordingly, in step S216, if q=1 (i.e., step S216 is executed at the first time), the layout adjustment unit 16 generates a copy of the layout setting table T2 for the target article (hereinafter called "target layout setting table") in the layout setting storage unit 126, and sets the item "TARGET SCREEN" of the record corresponding to the optional element [1] (i.e., "DATE AND TIME") to "1", which is the value of the screen number i, in the target layout setting table. Note that if q>1 (i.e., if execution of step S216 is at the second time or thereafter), the layout adjustment unit 16 sets the item "TARGET SCREEN" of the record corresponding to the optional element [q], to the value of the screen number i, in the target layout setting table having already been generated.

Subsequently, the layout adjustment unit 16 adds one to the element number q (S217). As a result, q=2. Subsequently, the layout adjustment unit 16 determines whether the optional element [2] corresponding to the element number q=2 is present or not (S211). According to FIG. 6, "PLACE" corresponding to the optional element [2] is present. Consequently, in this case, the processing proceeds to step S212.

In step S212, the layout adjustment unit 16 acquires "KaiJou:XXKouEn" (Venue: XX Park) that is the article element (optional element) corresponding to the optional element [2] from the target article element group input from the layout acquisition unit 14. Subsequently, the layout adjustment unit 16 acquires the height of the optional element [2] from the element size storage unit 125 (FIG. 16) (S213). That is, elem2{height}=260 (px), which is the height of "PLACE" is acquired.

Subsequently, the layout adjustment unit 16 adds the height of the optional element [2] to the threshold "sum" (S214). As a result, "sum" is updated as follows.

sum=0+elem1{height}+elem2{height}=0+260+ 260=520

Subsequently, the layout adjustment unit 16 compares the value of the threshold "sum" with the height of the empty area div{height} (S215). Here, sum=520 div{height}=528

Accordingly, sum≤div{height} holds. Consequently, in this case (Yes in S215), the layout adjustment unit 16 allocates the optional element [2] to the screen corresponding to the screen number 1 (S216). Specifically, the layout adjustment unit 16 sets the item "TARGET SCREEN" of the record corresponding to the optional element [2] (i.e., "PLACE"), to "1", which is the value of the screen number i, in the target layout setting table (FIG. 17).

Subsequently, the layout adjustment unit 16 adds one to the element number q (S217). As a result, q=3. Subsequently, the layout adjustment unit 16 determines whether the optional element [3] corresponding to the element number q=3 is present or not (S211). According to FIG. 6, "DESCRIPTION" corresponding to the optional element [3] is present. Consequently, in this case, the processing proceeds to step S212.

In step S212, the layout adjustment unit 16 acquires "YYYEkiKaRaAruITeSuGuNoToKoRoNiARuKouEn-DeSu. SakuraNoJiKiNiHa, EnNaiHaSakuraNoHanaDeIT-suPaINiNaRiMaSu." (The Park is a short walk from YYY station. The Park is full of cherry blossoms at the cherry blossom season), which is the article element (optional element) corresponding to the optional element [3], from the target article element group input from the layout acquisition unit 14. Subsequently, the layout adjustment unit 16 acquires the height of the optional element [3] from the element size storage unit 125 (FIG. 16) (S213). That is, elem3{height}=344 (px), which is the height of "DESCRIPTION" is acquired.

Subsequently, the layout adjustment unit 16 adds the height of the optional element [3] to the threshold "sum" (S214). As a result, "sum" is updated as follows.

sum=0+elem1{height}+elem2{height}+ elem3{height}=0+260+260+344=864

Subsequently, the layout adjustment unit 16 compares the value of the threshold "sum" with the height of the empty area div{height} (S215). Here, sum=864 div{height}=528

Accordingly, sum>div{height}. Consequently, in this case (No in S215), the layout adjustment unit 16 compares the height of the empty area div{height} with the optional element [3] (S218). Here, div{height}=528 elem3{height}=344

Accordingly, div{height}>elem3{height} holds. Consequently, in this case (No in S218), the layout adjustment unit 16 adds one to the screen number i (S220). As a result, i=2.

Subsequently, for the threshold "sum", the layout adjustment unit 16 substitutes the value of the threshold "sum" in the height of the optional element [3] elem3{height} (S221). As a result, sum=elem3{height}=344 holds.

Subsequently, the layout adjustment unit 16 allocates the optional element [3] to the screen corresponding to the screen number 2 (S216). Specifically, the layout adjustment unit 16 sets the item "TARGET SCREEN" of the record corresponding to the optional element [3] (i.e., "DESCRIPTION"), to "2", which is the value of the screen number i, in the target layout setting table (FIG. 17).

As a result, the content of the target layout setting table is updated as shown in FIG. 18. FIG. 18 shows an example of an update result of the target layout setting table. According to FIG. 18, among the optional elements of the target article, the values of "TARGET SCREEN" of "DATE AND TIME" and "PLACE" are "1", and the value of "TARGET SCREEN" of "DESCRIPTION" is "2". This means that the target article element group is distributed to two screens.

Subsequently, the layout adjustment unit 16 adds one to the element number q (S217). As a result, q=4. Subsequently, the layout adjustment unit 16 determines whether the optional element [4] corresponding to the element number q=4 is present or not (S211). According to FIG. 6, there is no optional element [4]. Consequently, in this case (No in S211), the layout adjustment unit 16 calculates the display time period for each of screens (here, two screens) for the target article (S222).

For example, the layout adjustment unit 16 aggregates the number of characters of the article element item to which the screen number is allocated, for each "SCREEN NUMBER" (here "1" or "2") in the target layout setting table (FIG. 18), and calculates the display time period using a formula, such as γ×the number of characters (seconds). In this case, the numbers of characters of the article element items whose "SCREEN NUMBER" is "ALL SCREENS" are adopted as aggregation targets, for each screen. According to the target layout setting table of FIG. 18, the numbers of characters of "TITLE", "DATE AND TIME" and "PLACE" are aggregated as the number of characters of the screen whose "SCREEN NUMBER" is "1", and the numbers of characters of "TITLE" and "DESCRIPTION" are aggregated as the number of characters of the screen whose "SCREEN NUMBER" is "2". In a case where "IMAGE" includes no character, the case is not regarded as the aggregation target of the number of characters. In a case where "IMAGE" includes characters, the number of characters may be preliminarily stored and regarded as the aggregation target.

Specifically, the number of characters of the first screen is 28.5, which is the aggregate of the numbers of characters of "Dai21KaiXXKouEnSakuraMaTsuRi" (21-th XX Park Cherry Blossom Festival), "NichiJi:2018Nen3Gatsu18-Nichi" (Date and time: Mar. 18, 2018), and "KaiJou:XXKouEn" (Venue: XX Park). Note that each half-width numerals is each counted as 0.5 characters. The number of characters of the second screen is 59, which is the aggregate of the numbers of characters of "Dai21KaiXXKouEn- SakuraMaTsuRi" (21-th XX Park Cherry Blossom Festival), "YYYEkiKaRaAruITeSuGuNoToKoRoNiARuKouEnDe-Su." ((The Park is a short walk from YYY station) and "SakuraNoJiKiNiHa, EnNaiHaSakuraNoHanaDeITsu-PaINiNaRiMaSu." (The Park is full of cherry blossoms at the cherry blossom season). Here, γ is assumed as 2.5. The display time period for the first screen is 28.5×0.25=7.125 (seconds). The display time period for the second screen is 59×0.25=14.75 (seconds). Note that calculation is performed with an assumption that each half-width character is regarded as 0.5 characters. Alternatively, it may be regarded as one character. Symbols that are not pronounced during reading, such as punctuation marks and parentheses, may be excluded and calculated.

As described above, in the case where the display time period is calculated according to γ×the number of characters, the display time period can be configured to be long for a screen with a large amount of information, and the display time period can be configured to be short for a screen with a small amount of information. Each screen can be displayed according to the amount of information on the screen. In this example, the amount of information is calculated from the number of characters. However, if the display time period is determined only by the number of characters, there is a possibility that the display time period is too short for the amount of information, for the screen with a small number of characters as with the screen including the article element item "IMAGE".

Accordingly, the layout adjustment unit 16 may calculate the display time period for each screen using a formula, such as γ×the number of characters+offset value Δ (seconds). Accordingly, a display time period of the offset value Δ (seconds) can be secured for each screen at the minimum. The value of Δ can be set to a positive value, such as at least five seconds or more. As a result, in the case where the display time period is calculated by γ×the number of characters, display is performed for at least Δ (seconds) even for a display target screen that is a screen with a display time period of 0 or about 0. Accordingly, when the display target is switched from the screen of concern to the next screen, a time period allowing the user to recognize the switching can be secured.

On the other hand, if the display time period is determined on a screen-by-screen basis, the display time period varies for each screen. If the display time period is different for each screen, it is difficult for the user to estimate the display time period. A possibility can be considered that the screen is switched at the middle of reading of the characters on the screen. Accordingly, for example, the layout adjustment unit 16 may aggregate the number of characters for each screen number, calculate the display time period using a formula, such as γ×the number of characters+offset value Δ (seconds), and adopt the maximum value ("14.75 seconds" in the above example) of the display time period calculated for each screen, as the display time period for every screen. In the case where maximum value of the display time period for each screen is adopted as the display time period for each screen, each screen transitions at regular intervals. Accordingly, the user can easily predict the screen switching timing, and determine whether the user view the screen or not. For all the screens, viewing can be allowed with leeway.

Alternatively, for example, the layout adjustment unit 16 may calculate the number of characters for each screen number, calculate the display time period using a formula, such as γ×the number of characters (seconds), and adopt the average value ("10.9 seconds" in the above example) of the display time periods calculated on a screen-by-screen basis, as the display time period for every screen. In the case where the average value of the display time periods for the screens is adopted as the display time period for every screen, each screen transitions at regular intervals. Accordingly, the user can easily predict the transition timing, and determine whether the user view the screen or not. The screen transitions according to the average value of the amounts of information for the screens. Accordingly, the entire article can be grasped in a manner viewable to a certain extent and in a short time period.

Alternatively, in the case where the target article element group is distributed to multiple screens, there is a possibility that the time period required by the viewer for reading each screen varies according to the difficulty of content even if the number of characters of pieces of writing (texts) in each screen is the same. Accordingly, if the display time period is determined simply by the number of characters, there is a possibility that the viewer cannot completely read the illegible screen (having relatively high difficulty). The layout adjustment unit 16 estimates the difficulty of pieces of writing indicated by the texts of the article elements included in the screen on a screen-by-screen basis, and can change the display time period for the screen according to the difficulty.

Specifically, the layout adjustment unit 16 calculates the difficulty of the article element text (character string) allocated to the screen from the word familiarity or the like of the words included in the text, on a screen-by-screen basis, and determines or calculates the display time period on the basis of the difficulty. For example, a correspondence table between the difficulty range and the display time period may be preset, and stored in the auxiliary storage device 102 or the like. In this case, the layout adjustment unit 16 identifies the display time period corresponding to the range including the difficulty of the screen of concern, on a screen-by-screen basis. Alternatively, a function may be defined that adopts the difficulty as the explanatory variable while adopting the display time period as the objective variable. In this case, the layout adjustment unit 16 may substitute the difficulty of each screen in the explanatory variable of the function on a screen-by-screen basis, thus calculating the display time period for the screen of concern. Calculation of the difficulty of text is not limited to a predetermined one, and may be performed using another publicly known method. Alternatively, the difficulty of each article element may be set by the user. In this case, the layout adjustment unit 16 may aggregate the difficulty of each of the article elements included in the screen on a screen-by-screen basis, thus calculating the difficulty of the screen of concern. A function or a table may be prepared where the difficulty of each of article elements included in the screen is combined with the number of characters of pieces of writings (texts) in each screen described above, the higher the difficulty is, or the more the number of characters of the pieces of writing (texts) is, the longer the display time period is. The display time period for the screen may be calculated using such a function or a table.

Alternatively, for example, in the process of calculating the display time period as described above, the layout adjustment unit 16 may exclude, from the aggregation target, the number of characters or the difficulty of the article element (e.g., "TITLE" etc.) displayed on every screen, for the second screen and thereafter. That is, the article element to be commonly allocated to the screens may be excluded from calculation of the display time period for one or some screens among the screens. There is a low possibility that the article element to be redundantly displayed serves as an object to be viewed. Consequently, this configuration can display each screen in a time period that is close to an actual viewing speed as much as possible, and reduction of stress on the viewer of the target article can be expected accordingly. Note that the user may be allowed to set whether or not to exclude the number of characters of the article element to be displayed on every screen from the aggregation target of the number of characters, for the second screen and thereafter. In this case, a setting value indicating whether or not to adopt the number of characters of the article element to be displayed on every screen as the aggregation target for the second screen and thereafter is preliminarily stored in the auxiliary storage device 102 or the like. Based on the setting value, the layout adjustment unit 16 determines whether or not to adopt the number of characters of the article element to be displayed on every screen as the aggregation target for the second screen and thereafter.

After completion of step S222, the layout adjustment unit 16 inputs the target article element group, the target layout setting table (FIG. 18), the display time period calculated on a screen-by-screen basis, and the target layout information (FIG. 13), into the output content generation unit 17. Description in the case of Yes in step S218 is made later.

Subsequently, the output content generation unit 17 corrects html, css, and js that serve as target layout information, or a script for outputting them, on the basis of the target article element group, the target layout setting table (FIG. 18) and the display time period calculated for each screen, and generates and html, css, and js (hereinafter called "output content") of the target article (S223).

Methods of displaying the target article element group in a manner dispersed to multiple screens include: a method of generating a html file for each screen number, and describing JavaScript® causing the screen to transition after the lapse of time of the display time period of the screen of concern, and achieving recursive display; and a method of recursively rewriting css and each tag element based on js files with respect to each display time period. In the example of FIG. 13, "AREA FOR OPTIONAL ELEMENT" is defined as a div element, and each optional element is added as a character string. Alternatively, the element may be added as another HTML element, such as a p element.

The output content generation unit 17 transmits the generated output content to the user terminal 20. The browser of the user terminal 20 displays the target article on the basis of the output content.

FIG. 19 shows an example of display results of the target article. In FIG. 19, "TITLE AREA" and "IMAGE AREA" are displayed on both the first and second screens, in conformity with FIG. 18. On the other hand, the optional element [1] ("DATE AND TIME") and the optional element [2] ("PLACE") are displayed only on the first screen, and the optional element [3] ("DESCRIPTION") is displayed only on the second screen. Furthermore, in conformity with FIG. 18, each area is arranged in a centered manner with respect to the entire display region. Moreover, in conformity with FIG. 18, the arrangement positions of the article elements in the corresponding areas are such that "TITLE" and "IMAGE" are centered, and "DATE AND TIME", "PLACE" and "DESCRIPTION" are left-aligned.

Note that the two screens may be alternately displayed in a manner of the first screen, then the second screen, and subsequently the first screen. In a case where the target article element group is distributed to three or more screens, the three or more screens may be cyclically displayed. In this case, the display time period for each screen conforms to the display time period set for the corresponding screen with respect to the output content.

Note that in this embodiment, the example where all the optional elements are texts have been described. Alternatively, optional elements that include still images or moving images may be defined. The optional element that includes a still image or a moving image may be dealt with similarly to the image area. That is, in this embodiment, the article elements include article elements made up of texts, and article elements made up of images. Alternatively, the content of article elements may be freely defined; for example, article elements made up of moving images may be defined. In the case of a moving image, the display time period is clearly indicated. Accordingly, in consideration with the time period, the display time period may be set.

Figure 20:
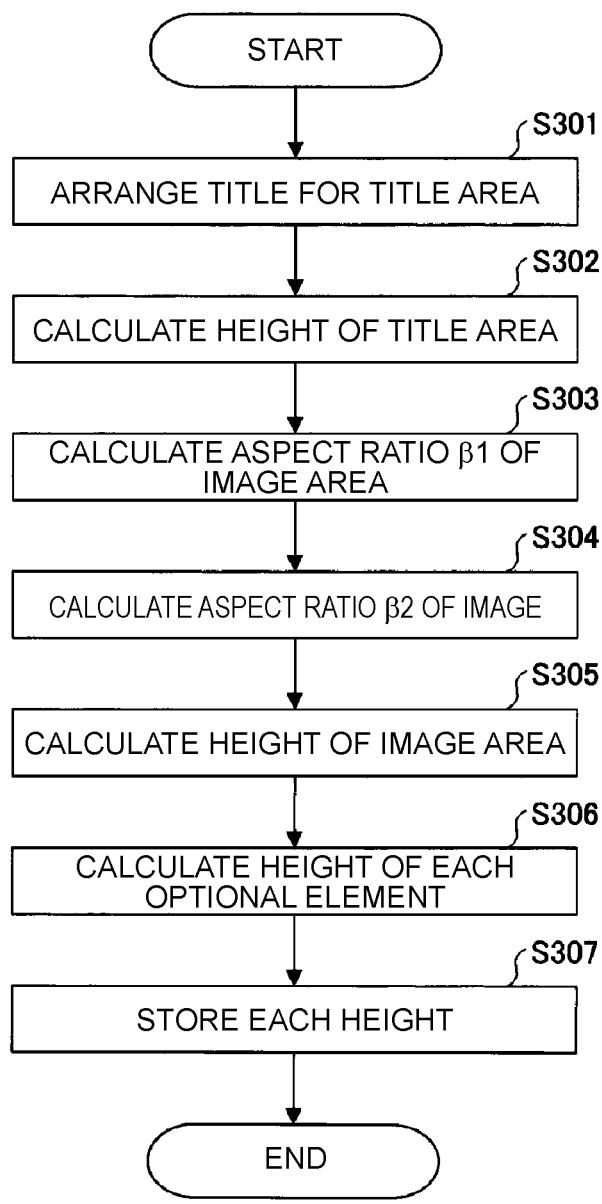
FIG. 20 is a flowchart for illustrating an example of a process of calculating the height of each article element.

Subsequently, a process of calculating the size (height) of each article element stored in the element size storage unit 125 on an article-by-article basis is described. FIG. 20 is a flowchart for illustrating an example of the process of calculating each article element. Note that the processing procedures of FIG. 20 are executed on an article-by-article basis, and may be executed after completion of the processing procedures of FIG. 4 or executed before step S213 of FIG. 11. In a case where the processing procedures of FIG.

20 are executed after completion of the processing procedures of FIG. 4 and before the processing procedures of FIG. 11, the value of the display parameter is not identified. Consequently, in this case, the processing procedures of FIG. 20 may be executed for each of the values of the display parameters ("Portrait" and "Landscape").

In step S301, the size calculation unit 15 applies "TITLE" of the target article to "TITLE AREA" (FIG. 14). In this embodiment, in the case of the article element made up of texts, the lateral width of the article element is fixed, and the height may be changed in an upper limit range according to the number of characters. "TITLE" is made up of a text. Accordingly, the lateral width of "TITLE AREA" is fixed, the height is changed according to the number of characters "TITLE".

Here, the upper limit of the number of lines "TITLE AREA" (hereinafter called "upper limit number of lines") is defined as h1{max_line}, the upper limit of the number of characters per line (hereinafter called "UPPER LIMIT NUMBER OF CHARACTERS") is defined as h1{max_char}, the actual number of lines is defined as h1{line}, and the actual maximum number of characters per line is defined as h1{char}. The values of h1{max_line} and h1{max_char} are preset with respect to each of the article type and the display parameter, in the size parameter storage unit 124.

FIG. 21 shows a configuration example of the size parameter storage unit 124. In FIG. 21, an example of the size parameters for the article type "EVENT" and the display parameter "PORTRAIT" is shown.

According to FIG. 21, h1{max_line}=3, and h1{max_char}=7. Consequently, in this case, a candidate of the arrangement positions of the characters for the title area is as shown in FIG. 22.

Figure 22:
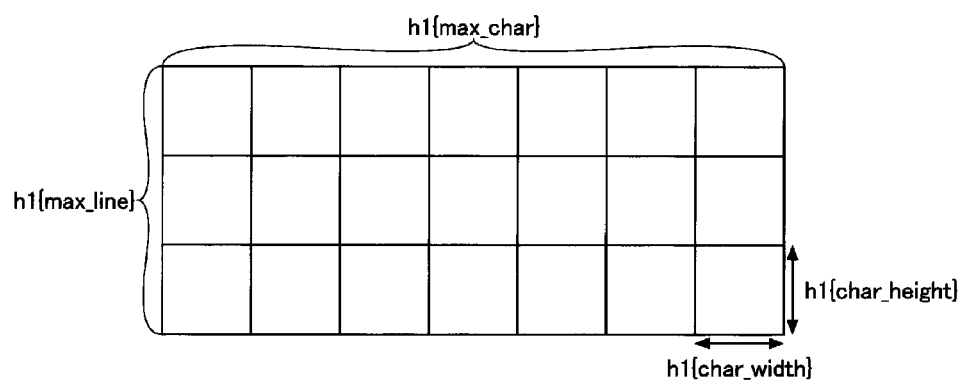
FIG. 22 shows an example of a candidate of arrangement positions of characters for a title area.
Figure 23:
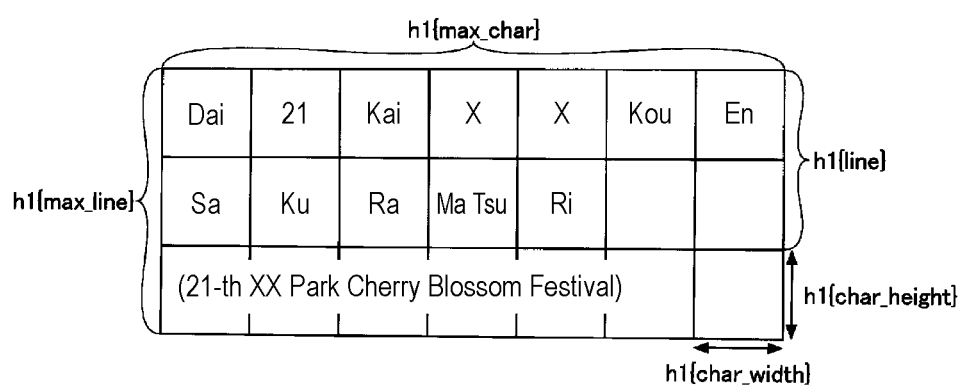
FIG. 23 shows an arrangement example of a first arrangement example of a title for a title area.

Consequently, the size calculation unit 15 applies the character string of the title "Dai21KaiXXKouEn- SaKuRa-MatsuRi" (21-th XX Park Cherry Blossom Festival) to FIG. 22. As a result, about the arrangement of the title in the title area, a result as shown in FIG. 23 is obtained. In this case, the actual number of lines h1{line} is 2. The actual maximum number of characters per line h1{char} is 7. Note that in calculation of the height of each area, the arrangement position of the article element in each area (FIG. 18) is not required to be considered.

It is assumed that the title is "Dai21KaiXXShiMin-KouEnSaKuRaMaTsuRiTaiKaiZenYaSai" (XX Civic Park Cherry Blossom Festival Pre-Festival Meeting). In this case, the result of arrangement of the title area is as shown in FIG. 24. In FIG. 24, the actual number of lines h1{line} is three. The actual maximum number of characters per line h1{char} is seven.

It is further assumed that the title is "XXSaKuRaMatsu". In this case, the result of arrangement of the title area is as shown in FIG. 25. In FIG. 25, the actual number of lines h1{line} is one. The actual maximum number of characters per line h1{char} is six.

It is herein shown that h1{max_line}=3, and h1{max_char}=7. If the upper limit number of lines h1{max_line} is set to two, and the title is "Dai21KaiXXShiMin- KouEn-SaKuRaMaTsuRiTaiKaiZenYaSai" (21-th XX Civic Park Cherry Blossom Festival Pre-Festival Meeting) as shown in FIG. 24, the title exceeds the limitation of the number of characters for the title area. In such a case, the size calculation unit 15 may edit "TITLE" so as not to exceed the limitation of the number of characters.

For example, as for the title "Dai21KaiXXShiMinKou- EnSaKuRaMaTsuRiTaiKaiZenYaSai" (21-th XX Civic Park Cherry Blossom Festival Pre-Festival Meeting), the size calculation unit 15 assumes that "Dai21KaiXXShiMin" is the first line, "KouEnSaKuRaMaTsuRi" is the second line, and removes the character string included on the third line. Furthermore, the size calculation unit 15 may replace the last character on the second line with " . . . ", and obtain "Dai21KaiXXShiMin" on the first line, and "KouEnSaKuRaMaTsuRi . . . " on the second line so as to show the deletion at the middle of the title and thereafter. Such correction may be applied to the "TITLE" in the target article element group, if the processing procedures of FIG. 20 are executed by the processing procedures of FIG. 11.

Subsequently, the size calculation unit 15 calculates the height of "TITLE AREA" (S302). As shown in FIG. 22, the height h1{char_height} per character (per line) of the text and the lateral width h1{char_width} per character in the "TITLE AREA" depend on the font-size value of "TITLE AREA".

Accordingly, provided that the value of the font size of the characters of the title is h1{font-size}, the height h1{char_height} and the lateral width h1{char_width} can be represented using constant α1 or α2.

$$h1\{char\_height\}=\alpha 1 \times h1\{font\text{-}size\}$$

$$h1\{char\_width\}=\alpha 2 \times h1\{font\text{-}size\}$$

Here, α1, α2, h1{font-size} and h1{font-size} are preliminarily stored in the size parameter storage unit 124 (FIG. 21). According to the example shown in FIG. 21, α1=1.2, α2=1.1, and h1{font-size}=80. Consequently, h1{char_height} and h1{char_width} are as follows.

$$h1\{char\_height\}=1.2\times 80=96(px)$$

$$h1\{char\_width\}=1.1\times 80=88(px)$$

As described above the height of "TITLE AREA" can be calculated by the following equation.

$$h1\{height\}=h1\{char\_height\}\times h1\{line\}$$

Referring back to FIG. 23, h1{line}=2. Accordingly, the size calculation unit 15 calculates h1{height} as follows.

$$h1\{height\}=h1\{char\_height\}\times h1\{line\}= 96\times 2=192(px)$$

Note that the size calculation unit 15 may provide margins at upper and lower portions of "TITLE". For example, provided that each of the upper and lower margins is 150 px, the total is 300 px. Consequently, the height of "TITLE AREA" including the margins is 192+300=492 (px). The values of upper and lower margins may be stored in the size parameter storage unit 124.

Note that in the above description, h1{max_char}=7 is preset as shown in FIG. 22. Alternatively, the lateral width h1{width} of "TITLE AREA" may be set in the size parameter storage unit 124 (FIG. 21), and the size calculation unit 15 may calculate the maximum number of characters insertable in h1{width}, thus obtaining h1{max_char}. Provided that a function of rounding x off to return an integer is assumed as down(x), the maximum number of characters per line h1{max_char} is as follows.

$$h1\{line\_char\}=down(h1\{width\}/h1\{char\_width\})$$

For example, if the setting value of the lateral width h1{width} of "title area" is 680 px, h1{line_char} is calculated as follows.

$$h1\{line\_char\} = down(h1\{width\}/h1\{char\_width\})$$
$$= down(680/88) = 7$$

Furthermore, provided that a function of rounding x up to return an integer is assumed as up(x), the number of lines h1{line} can be calculated based on the number of lines h1{char_num} of the title, as follows.

$$h1\{line\} = \text{up}(h1\{char\_num\}/h1\{max\_char\})$$
$$= \text{up}(12/7) = 2$$

Consequently, h1{height} can be calculated as follows.

$$h1\{height\} = h1\{char\_height\} \times h1\{line\}$$
$$= \alpha 1 \times h1\{font\text{-}size\} \times h1\{line\}$$
$$= 1.2 \times 80 \times 2 = 192$$

As described above, the height h1{height} of "TITLE AREA" may be calculated from the lateral width h1{width} of "TITLE AREA" and the lateral width h1{char_width} of the character.

Subsequently, the size calculation unit 15 calculates the ratio between the height and the lateral width of "IMAGE AREA" (hereinafter called "aspect ratio $\beta 1$") (S303). Note that "IMAGE AREA" is a region that varies according to the size of the image. Provided herein that the maximum value of the height of "IMAGE AREA" is assumed as img{max_height}, and the maximum value of the lateral width is assumed as img{max_width}, the calculation formula of $\beta 1$ is as follows.

$$\beta 1 = \text{img}\{max\_height\}/\text{img}\{max\_width\}$$

As configured in FIG. 21, img{max_height}=500 (px). If the lateral width of the image img{max_width}=800 (px), the aspect ratio $\beta 1$ is as follows.

$$\beta 1 = \text{img}\{max\_height\}/\text{img}\{max\_width\}$$
$$= 500/800$$
$$= 0.625$$

Subsequently, the size calculation unit 15 calculates the ratio between the height and the lateral width of the image (FIG. 8) to be arranged in the image area (hereinafter called "aspect ratio $\beta 2$") (S304). Provided herein that the height of the image is assumed as img{height}, and the lateral width of the image is assumes as img{width}, the calculation formula of $\beta 2$ is as follows.

$$\beta 2 = \text{img}\{height\}/\text{img}\{width\}$$

As shown in FIG. 8, for an image hanami.jpg, if the height of the image is img{height}=300 (px) and the lateral width of the image is img{width}=400 (px), the vertical-to-lateral ratio $\beta 2$ is as follows. It may be configured such that img{height} and img{width} may be stored in the memory device 103 or the like when an image is acquired from the image file.

$$\beta 2 = \text{img}\{height\}/\text{img}\{width\}$$
$$= 300/400$$
$$= 0.75$$

Subsequently, the size calculation unit 15 enlarges or contracts the image and adjusts the size of the image so as to be the maximum in the image area, while keeping this $\beta 2$, thus calculating the height of the image area (S305).

Specifically, if $\beta 1 \leq \beta 2$, the size calculation unit 15 enlarges or contracts the image such that the height of the image can be equal to the height of the image area as shown in FIG. 27. The lower portion of FIG. 27 shows an example of enlarging the image in a case where $\beta 1$ is ¾ and $\beta 2$ is 2. On the other hand, if $\beta 1 > \beta 2$, the size calculation unit 15 enlarges or contracts the image such that the lateral width of the image can be equal to the lateral width of the image area as shown in FIG. 28. The lower portion of FIG. 28 shows an example of enlarging the image in a case where $\beta 1$ is ¾ and $\beta 2$ is ½.

According to the example described above, since $\beta 1$ (0.625)$\leq \beta 2$ (0.75), the size calculation unit 15 enlarges the image such that the height of the image can be equal to the height img{max_height} of the image area as shown in FIG. 27. Consequently, in this case, the height of the image is as follows.

$$\text{img}\{max\_height\}=500(px)$$

Note that also for "IMAGE AREA", the size calculation unit 15 may provide margins at the upper and lower portions of the image. For example, provided that each of the upper and lower margins is 200 px, the total is 400 px. Consequently, the height of "IMAGE AREA" including the margins is 500+400=900 (px). The values of upper and lower margins may be stored in the size parameter storage unit 124.

Note that if img{height}=750 (px) and the lateral width of the image is img{width}=1500 (px), the aspect ratio $\beta 2$ of the image is as follows.

$$\beta 2 = \text{img}\{height\}/\text{img}\{width\}$$
$$= 750/1500$$
$$= 0.5$$

In this case, $\beta 1 > \beta 2$. Accordingly, the size calculation unit 15 contracts the image such that the lateral width of the image can be equal to the lateral width of the image area as shown in FIG. 28. As a result, the height of "IMAGE AREA" is img{height} that is after contraction.

$$\text{img}\{height\}\text{after contraction}=\text{img}\{max\_width\}\times \beta 2 = 800 \times 0.5 = 400(px)$$

Note that the image is not necessarily enlarged or contracted. In a case without enlargement or contraction, the height img{height} of the image serves as the height of the image area. For example, in an example of img{height}=300 (px) and the lateral width of the image {width}=400 (px), the height of the image area is 300 px.

Subsequently, the size calculation unit 15 calculates the height elemq{height} of each optional element [q] (q=1, 2, 3) (S306). The height per character (per line) elemq{char_height} and the lateral width per character elemq{char_width} of the text of the optional element [q] depend on the font-size value of the optional element [q]. Accordingly, provided that the value of the font size of the character of the optional element [q] is elemq{font-size}, the height elemq{height} of the optional element [q] can be calculated using constants $\alpha q1$ and $\alpha q2$ as follows.

$$\text{elem}q\{\text{char\_height}\} = \alpha q1 \times \text{elem}q\{\text{font-size}\}$$

$$\text{elem}q\{\text{char\_width}\} = \alpha q2 \times \text{elem}q\{\text{font-size}\}$$

$$\text{elem}q\{\text{height}\} = \text{elem}q\{\text{char\_height}\} \times \text{elem}q\{\text{line}\}$$

Note that for the optional element [q] $\alpha q1$, $\alpha q2$, and elemq{font-size} are preliminarily stored in the size parameter storage unit 124.

Specifically, for the optional element [1], in FIG. 21, setting is made such that elem1{width}=800, elem1{font-size}=50, $\alpha 11$=1.2, and $\alpha 12$=1.5. Consequently, $$\text{elem1}\{\text{char\_height}\} = \alpha 11 \times \text{elem1}\{\text{font-size}\} = 1.2 \times 50 = 60 (px)$$

$$\text{elem1}\{\text{char\_width}\} = \alpha 12 \times \text{elem1}\{\text{font-size}\} = 1.5 \times 50 = 75 (px)$$

$$\text{elem1}\{\text{max\_char}\} = \text{elem1}\{\text{width}\} / \text{elem1}\{\text{char\_width}\} = 800/75 = 10.6$$

holds.

Referring to FIG. 10, the optional element [1] is "NichiJi:2018Nen3Gatsu18Nichi" (Date and time: Mar. 18, 2018). In this case, the colon ":" is counted as one full-width character. Each numeral is a half width. A half-width character is counted as 0.5 characters. Note that characters to be counted as full-width ones, and characters to be counted as half-width ones may be according to whether input characters are full-width ones or half-width ones. For example, even in a case where numerals are input as full-width characters that are "NichiJi:2018Nen3Gatsu18Nichi", all the characters including numerals are counted as full-width ones, each of which is counted as one character. Accordingly, the number of characters of the optional element [1] elem1{char}=9.5. The maximum number of characters per line is 10. Accordingly, it can be understood that the characters can be fit in one line. That is, the number of lines of the optional element [1] elem1{line}=1. Consequently, the height elem1{height} of the optional element [1] is calculated as follows.

$$elem1\{height\} = elem1\{char\_height\} \times elem1\{line\}$$
$$= 60 \times 1 = 60 \ (px)$$

Similar to the title area, margins may be provided at upper and lower positions. For example, provided that each of the upper and lower margins is 100 px, the total is 200 px. The height of the optional element [1] including the margins is 60+200=260 (px).

For the optional element [2], in FIG. 21, setting is made such that elem1{width}=800, elem2{font-size}=50, $\alpha 21$=1.2, and $\alpha 22$=1.5. Consequently, $$\text{elem2}\{\text{char\_height}\} = \alpha 21 \times \text{elem2}\{\text{font-size}\} = 1.2 \times 50 = 60 (px)$$

$$\text{elem2}\{\text{char\_width}\} = \alpha 22 \times \text{elem2}\{\text{font-size}\} = 1.5 \times 50 = 75 (px)$$

$$\text{elem2}\{\text{max\_char}\} = \text{elem2}\{\text{width}\} / \text{elem2}\{\text{char\_width}\} = 800/75 = 10.6$$

Referring to FIG. 10, the optional element [2] is "KaiJou: XXKouEn" (Venue: XX Park). Here, the colon ":" is counted as one full-width character. Accordingly, the number of characters of the optional element [2] elem2{char}=7. The maximum number of characters per line is 10. Accordingly, it can be understood that the characters can be fit in one line. That is, the number of lines of the optional element [2] elem2{line}=1. Consequently, the height elem2{height} of the optional element [2] is calculated as follows.

$$\text{elem2}\{\text{height}\} = \text{elem2}\{\text{char\_height}\} \times \text{elem2}\{\text{line}\} = 60 \times 1 = 60 (px)$$

Similar to the title area, margins may be provided at upper and lower positions. For example, provided that each of the upper and lower margins is 100 px, the total is 200 px. The height of the optional element [2] including the margins is 60+200=260 (px).

Furthermore, for the optional element [3], in FIG. 21, setting is made such that elem3{width}=800, elem3{font-size}=30, $\alpha 31$=1.2, and $\alpha 32$=1.5. Consequently, $$\text{elem3}\{\text{char\_height}\} = \alpha 31 \times \text{elem3}\{\text{font-size}\} = 1.4 \times 30 = 42 (px)$$

$$\text{elem3}\{\text{char\_width}\} = \alpha 32 \times \text{elem3}\{\text{font-size}\} = 1.2 \times 30 = 36 (px)$$

$$\text{elem3}\{\text{max\_char}\} = \text{elem3}\{\text{width}\} / \text{elem3}\{\text{char\_width}\} = 800/36 = 22.2$$

holds.

Referring to FIG. 10, the optional element [3] is "YYYEkiKaRaAruITeSuGuNoToKoRoNiARuKouEnDeSu. SakuraNoJiKiNiHa, EnNaiHaSakuraNoHanaDeITsuPaINiNaRiMaSu." (The Park is a short walk from YYY station. The Park is full of cherry blossoms at the cherry blossom season). The number of characters of the optional element [3] elem3{char}=47. The maximum number of characters per line is 22. Accordingly, it can be understood that the characters can be fit in three lines. That is, the number of lines of the optional element [3] elem1{line}=3. Consequently, the height elem3{height} of the optional element is calculated as follows.

$$elem3\{height\} = elem3\{char\_height\} \times elem3\{line\}$$
$$= 42 \times 3 = 126 \ (px)$$

Similar to the title area, margins may be provided at upper and lower positions. For example, provided that each of the upper and lower margins is 109 px, the total is 218 px. The height of the optional element [3] including the margins is 126+218=344 (px).

Subsequently, the size calculation unit 15 stores, in the element size storage unit 125 (FIG. 16), the height of each article element for the article name of the target article and the target display parameter value (S307). Specifically, the calculation result of the height of "TITLE AREA" is stored in "HEIGHT" of the line of "TITLE" in FIG. 16. The calculation result of the height of "IMAGE AREA" is stored in "HEIGHT" of the line of "IMAGE" in FIG. 16. The calculation result of the height of the optional element [1] is stored in "HEIGHT" of the line of "DATE AND TIME" in FIG. 16. The calculation result of the height of the optional element [2] is stored in "HEIGHT" of the line of "PLACE" in FIG. 16. The calculation result of the height of the optional element [3] is stored in "HEIGHT" of the line of "DESCRIPTION" in FIG. 16. Note that FIG. 16 shows the calculation result including the margins in the above description.

Note that in the above description, the example is shown where the margin of each area is preliminarily configured in a fixed manner. Alternatively, the margin of each area is not necessarily preliminarily configured. For example, the size calculation unit 15 may calculate the values of the margins of the areas corresponding to the respective article element items, on the basis of the number of article element items of the target article. Accordingly, the height of the margin may be changed according to the number of article element items, thereby adjusting the balance of the arrangement position of each article element in the output content of the target article.

Subsequently, the case where the determination in S218 of FIG. 11 is Yes is described. For example, it is assumed that the optional element [3] is "XXShiMinKouEnHa, YYY-EkiKaRaAruITeSuGuNoToKoRoNiARuKouEnDeSu. SakuraNoKiSeTsuNiNaRuTo, SoMeIYoShiNo, ShiDaReZ-aKuRaGaSaKiHoKoRiMaSu. SaKuRaMaTsuRiMoKo- ToShiDe21KkaiMeWoMuKaETe, KinRinNoMiNaSaMaNi-MoShitaShiMaReTeMaIRiMaShiTa. KinNenDeHaKen-NaiDaKeDeNaKuKenGaiKaRaMoOoKuNoKanKouKya-kuGa HanaMiNiOtozuReMaSu. MaTa, KaiGaiKaRaNo-OKyakuSamaMoOoKuOtozuReRuNinKiNoSuPoTtoDe-Su." (The XX Civic Park is a short walk from YYY station. Someiyoshino and weeping cherries bloom at the cherry blossom season. This year, Cherry Blossom Festival is 21-th. The festival has been familiarly known also to neighboring people. In recent years, many tourists not only in the prefecture but also outside of the prefecture have visited. This is a popular spot many guests from abroad visit.) Provided that elem3{max_char}=7, the optional element [3] is described in nine lines as follows.

The first line is "XXShiMinKouEnHa, YYYEkiKaRa-AruITeSu".

The second line is "GuNoToKoRoNiARuKouEnDeSu. SakuraNoKiSeTsuNi".

The third line is "NaRuTo, SoMeIYoShiNo, ShiDaR-eZaKuRaGa"

The fourth line is "SaKiHoKoRiMaSu. SaKuRa-MaTsuRiMoKoToShiDe21Kkai.

The fifth line is "MeWoMuKaETe, KinRinNoMiNaSa-MaNiMoShitaShiMaReTe".

The sixth line is "MaIRiMaShiTa. KinNenDeHaKenNai-DaKeDeNaKu".

The seventh line is "KenGaiKaRaMoOoKuNoKanK-ouKyakuGaHanaMiNiOtozuReMa".

The eighth line is "Su. MaTa, KaiGaiKaRaNoOKyakuSa-maMoOoKuOtozuRe".

The ninth line is "RuNinKiNoSuPoTtoDeSu".

Here, it is assumed that elem3{height}=540.

div{height}=528 elem3{height}=540

Accordingly, div{height}≤elem3{height} holds. Consequently, in this case (Yes in S218), the processing proceeds to step S219.

In step S219, the layout adjustment unit 16 corrects elem3{height} and obtains elem3{m_height}. Specifically, the layout adjustment unit 16 determines elem3{m_height} so as to satisfy div{height}>elem3{m_height}. The optional element [3] is an element made up of a text. Provided that the number of lines is L and the height of the text is T, calculation can be performed with L=9 and the height of the text T=60, in this example.

That is, elem3{height}=LT

The layout adjustment unit 16 adjusts L so as to satisfy div{height}≤elem3{height}=LT Here, div{height}−LT is −12, which is a negative value. However, decrement of L one by one changes the value to be positive. L when the value is changed to be positive at the first time is assumed as L', and (L'+1)-th line and thereafter are removed, and then elem3{m_height}=L'T is obtained.

In this example, at L=8, LT=480 is obtained, which can satisfy div{height}>elem3{m_height}. Consequently, L'=8, and elem3{m_height} is 480 (px). Here, the ninth line of the optional element [3] is removed and eight lines are adopted, and the layout adjustment unit 16 may replace the last character on the eighth line with " . . . ", indicating that characters thereafter are omitted. In this case, the eight line becomes "Su. MaTa, KaiGaiKaRaNoOKyakuSa-maMoOoKuOtozu . . . ".

As described above, according to the first embodiment, for each of pieces of information (article elements), the size of the display region of the display device 30 is calculated. Based on the size of each of the pieces of information and the size of the display region, whether or not the pieces of information are arrangeable in the display region is determined. If the pieces of information cannot be arranged in the display region, the pieces of information are allocated in a manner distributed to multiple screens each of which can be fit in the display region. The output content of the pieces of information is generated.

Consequently, in comparison with a case where the character size is reduced and the pieces of information are fit in the one screen in a forced manner, the possibility that the information with a character size viewable by the viewer can be improved. That is, the information can be legibly viewable.

The pieces of information (article elements) are automatically allocated to the respective screens as described above. Accordingly, the cost of constructing content production can be reduced. Furthermore, content to be displayed in a visible layout for people viewing digital signage can be automatically created without need of specialized knowledge.

The common layout, for example, the title can be displayed commonly to each screen, which can clearly indicate that pieces of content pertain to the same title. Accordingly, understanding of content by the viewer of the digital signage can be facilitated.

Second Embodiment

Next, a second embodiment is described. In the second embodiment, differences of the second embodiment from the first embodiment are described. Points having not been specifically mentioned in the second embodiment may be similar to those in the first embodiment.

In the first embodiment, the method of arranging the article elements, such as the title, in the display region with the height of 1920 px and the lateral width of 1080 px, has been described. However, the application range of this embodiment is not limited only to the rectangular region.

FIG. 29 shows an example of the display region divided into three regions. That is, in FIG. 29, the region with the height of 1080 px and the lateral width of 1920 px is divided into three, which are a region 1, a region 2 and a region 3. In FIG. 29, the screen is arranged in a landscape orientation. Accordingly, this is the case where the target display parameter value is "Landscape".

In the second embodiment, for example, the auxiliary storage device 102 or the like stores setting data (hereinafter called "arrangement region setting data") indicating arrangement of the article elements in the respective regions, with respect to each article type and each display parameter.

FIG. 30 shows a configuration example of arrangement region setting data. FIG. 30 shows the example where "DISPLAY REGION" and "COMMONLY DISPLAYED ON ALL SCREENS" are set for each article element item. "DISPLAY REGION" is an item indicating the number of the region where the article element is displayed. "COMMONLY DISPLAYED ON ALL SCREENS" is an item indicating whether the element is to be displayed on all the screens (TRUE) or not (FALSE) when the target article element group is distributed to the screens.

Referring to FIG. 30, "TITLE" is arranged in the region 1, "IMAGE" is arranged in the region 3, and "DATE AND TIME", "PLACE" and "DESCRIPTION" are arranged in the region 2. For "TITLE", "IMAGE" and "DATE AND TIME", "COMMONLY DISPLAYED ON ALL SCREENS" is set to "TRUE".

"TITLE" is assumed to be a text. In the first embodiment, as shown in FIG. 22, the example where the maximum values of the height and lateral width of the title area are set has been described. However, if the height and the lateral width of the region 1 in FIG. 29 are set as the maximum value of the height of the title area and the maximum value of the lateral width, "TITLE" does not protrude from the region 1.

Likewise, while the image is displayed in the region 3, setting of the height and lateral width of the region 3 as the maximum value of the height img{max_haight} and the maximum value of the lateral width img{max_width} of the image area shown in FIG. 21 prevents the image from protruding the region 3.

For the region 2, in FIG. 30, "DATE AND TIME", "PLACE" and "DESCRIPTION" are arranged, and "COMMONLY DISPLAYED ON ALL SCREENS" of "DATE AND TIME" is set to "TRUE". "DATE AND TIME", "PLACE" and "DESCRIPTION" in this case can be arranged in a manner similar to that in the first embodiment.

Figure 31:
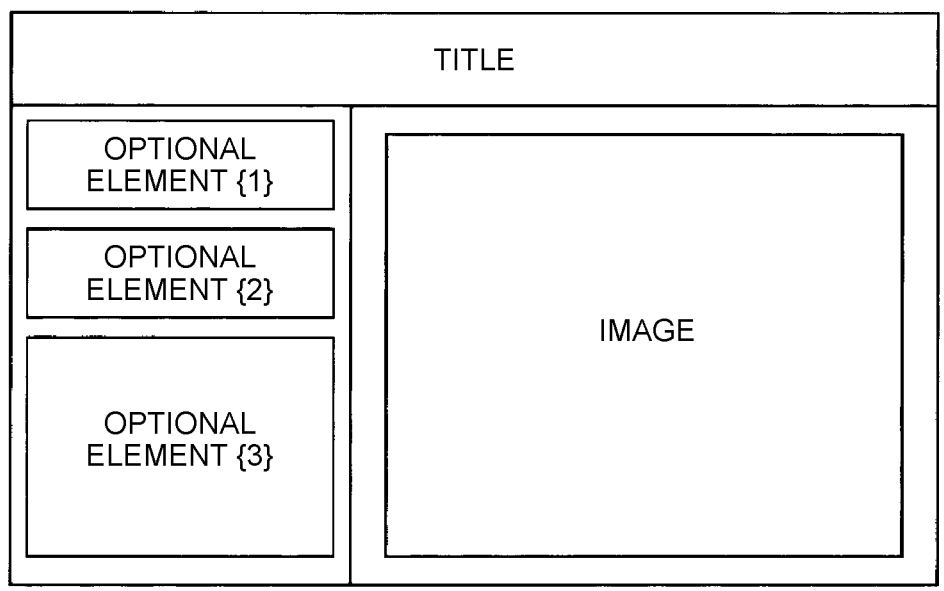
FIG. 31 shows an arrangement example of each article element in a second embodiment.

FIG. 31 shows an arrangement example of each article element in the second embodiment. FIG. 31 shows an example where "TITLE" is arranged in the region 1, the optional element [1] ("DATE AND TIME"), the optional element [2] ("PLACE") and the optional element [3] ("DESCRIPTION") are arranged in the region 2, and "IMAGE" is arranged in the region 3.

As described above, also in the screen dividable into multiple areas, each article element can be arranged.

Third Embodiment

Next, a third embodiment is described. In the third embodiment, differences from the aforementioned embodiments are described. Points having not been specifically mentioned in the third embodiment may be similar to those in the aforementioned embodiments.

The example where the size of the display region is fixed (main{height}=1920 px, main{width}=1080 px) has thus been described above. In this case, if the display size of the display device 30 decreases, the size of the character to be displayed decreases, and there is a possibility that display with the minimum size of the character viewable by the viewer (hereinafter called "minimum character size") becomes difficult. Note that the minimum character size is a physical size, such as a size with units of centimeters.

In the third embodiment, the content of the layout information (FIG. 13) and the size parameter group (FIG. 21) is set with respect to each display size. Specifically, a correspondence table between the display sizes, and the layout information (FIG. 13) and size parameter group (FIG. 21) is preliminarily generated and stored in the auxiliary storage device 102 or the like. The layout adjustment unit 16 and the size calculation unit 15 execute a process using the layout information or the size parameter group that correspond to the display size of the display device 30. This process can change the layout of the output content according to the display size, in a state of securing the minimum character size. Note that the display size may be input (set) by the user, or automatically detected by the output content generation device 10, for example.

Fourth Embodiment

Next, a fourth embodiment is described. In the fourth embodiment, differences from the aforementioned embodiments are described. Points having not been specifically mentioned in the fourth embodiment may be similar to those in the aforementioned embodiments.

According to the resolution of the display device 30, ease of character discrimination is changed. For example, reduction in resolution reduces character discrimination. In the fourth embodiment, the lower the resolution of the display device 30 is, the larger the minimum character size is. Specifically, a correspondence table between the resolution, and the layout information (FIG. 13) and size parameter group (FIG. 21) is preliminarily generated and stored in the auxiliary storage device 102 or the like. Here, the layout information and the size parameter group are set such that the lower the resolution is, the larger the minimum character size is. The layout adjustment unit 16 and the size calculation unit 15 execute a process using the layout information or the size parameter group that correspond to the resolution of the display device 30. This process can change the layout of the output content, in a state of securing the minimum character size, which varies according to the resolution. Note that the resolution may be input (set) by the user, or automatically detected by the output content generation device 10, for example.

Fifth Embodiment

Next, a fifth embodiment is described. In the fifth embodiment, differences from the aforementioned embodiments are described. Points having not been specifically mentioned in the fifth embodiment may be similar to those in the aforementioned embodiments.

In the fifth embodiment, variation in ambient brightness (hereinafter simply called "brightness") according to the installation place of the display device 30 is considered. For example, when the place around the display device 30 is bright, the contrast is insufficient, and the content of the article is illegible.

In the fifth embodiment, pieces of the layout information (FIG. 13) are configured for respective brightnesses. Specifically, a correspondence table between the brightness and the layout information (FIG. 13) is preliminarily generated and stored in the auxiliary storage device 102 or the like. The layout adjustment unit 16 executes a process using the piece of layout information corresponding to the brightness of the display device 30. The pieces of layout information have different configurations of background colors and character colors. Although not shown in FIG. 13, the background color and character color can be described in a css file. Accordingly, the combination can be changed. That is, in a piece of layout information corresponding to a relatively high brightness is set to have high contrast between the background color and the character color. This setting can change the contrast of the output content according to the brightness. Note that the brightness may be input (set) by the user, or automatically detected by the output content generation device 10, for example.

Sixth Embodiment

Next, a sixth embodiment is described. In the sixth embodiment, differences from the aforementioned embodiments are described. Points having not been specifically mentioned in the sixth embodiment may be similar to those in the aforementioned embodiments.

In the sixth embodiment, a header region and a footer region are provided in the article output content. The header region is a region above the area arranged uppermost (the title area in the example of FIG. 15) in the display region. The footer region is a region below the area arranged lowermost (the area for the optional element 3 in the example of FIG. 15) in the display region.

The heights of the header region and the footer region may be fixedly set. Alternatively, the heights may be changed according to the display size, the resolution or the like of the display device 30, for example. In this case, the layout information (FIG. 13) where the header region and the footer region vary according to the display size and the resolution is set. The layout adjustment unit 16 is allowed to use the layout information that is different according to the display size or the resolution of the display device 30.

Likewise, the inner size of each area may be set so as to be different in the layout information according to the display size, the resolution or the like.

Seventh Embodiment

Next, a seventh embodiment is described. In the seventh embodiment, differences from the third or fourth embodiment are described. Points having not been specifically mentioned in the seventh embodiment may be similar to those in the third or fourth embodiment.

In the third or fourth embodiment, in the case where the layout information is set according to the display size, the resolution or the like so as to secure the minimum character size, each area is not necessarily arranged in a single file in the vertical direction or the horizontal direction. Alternatively, the layout information may be set such that multiple areas are arranged in the horizontal direction or the vertical direction. Specifically, if the display parameter value is "Portrait", for the display size or the resolution that allows multiple areas to be arranged in the horizontal direction within a range where the minimum character size can be secured (for the display size or the resolution where the area to be originally displayed at a lower position can be arranged in the horizontal direction with respect to the adjacent upper area), the layout information may thus be defined, thereby displaying the target article on screens the number of which is as small as possible. Likewise, if the display parameter value is "Landscape", for the display size or the resolution that allows multiple areas to be arranged in the vertical direction within a range where the minimum character size can be secured (for the display size or the resolution where the area to be originally arranged to the right can be arranged in the vertical direction with respect to the adjacent left area), the layout information may thus be defined, thereby displaying the target article on screens the number of which is as small as possible.

Eighth Embodiment

Next, an eighth embodiment is described. In the eighth embodiment, differences from the aforementioned embodiments are described. Points having not been specifically mentioned in the eighth embodiment may be similar to those in the aforementioned embodiments.

In the eighth embodiment, the size calculation unit 15 calculates the character size according to the display size or the resolution of the display device 30, for each article element (for example, "TITLE" and "OPTIONAL ELEMENT") of the text. For each article element of the text, the size calculation unit 15 calculates the maximum character size that is not less than the minimum character size for the article element and can fit the article element in the area corresponding to the article element, and arranges, in the area, the article element with the font size corresponding to the maximum character size. Accordingly, the output content in a legible manner for the viewer as much as possible can be generated.

Ninth Embodiment

Next, a ninth embodiment is described. In the ninth embodiment, differences from the aforementioned embodiments are described. Points having not been specifically mentioned in the ninth embodiment may be similar to those in the aforementioned embodiments.

In the ninth embodiment, for the article element of the text, setting pertaining to whether linefeed in the morpheme is allowed or not can be made. The setting value for this setting is stored in the auxiliary storage device 102 or the like, for example.

If setting where linefeed in the morpheme is not allowed is made when the layout adjustment unit 16 arranges the article element in the area corresponding to the article element, the article element is arranged in the area such that linefeed is not performed in the morpheme. Specifically, when a morpheme across lines occurs, the layout adjustment unit 16 performs linefeed at the beginning of the morpheme. Accordingly, the article element becomes legible.

Tenth Embodiment

Next, a tenth embodiment is described. In the tenth embodiment, differences from the aforementioned embodiments are described. Points having not been specifically mentioned in the tenth embodiment may be similar to those in the aforementioned embodiments.

In the tenth embodiment, the layout information is defined such that the total number of screens (the number of divided screens) and the current screen number are displayed, for example, in the footer region, in each screen of the target article. For example, these pieces of information may be displayed in a format of "current page number/the total number of screens". Accordingly, the viewer can grasp the number of screens constituting the target article, and the order of screen that is being viewed.

Eleventh Embodiment

Next, an eleventh embodiment is described. In the eleventh embodiment, differences from the aforementioned embodiments are described. Points having not been specifically mentioned in the eleventh embodiment may be similar to those in the aforementioned embodiments.

In the eleventh embodiment, the layout information is defined such that the remaining display time period is displayed, for example, in the footer region, in each screen of the target article. For example, the screen display time period, and the remaining display time period may be represented as numerical values. Alternatively, the remaining display time period may be represented in a format of a bar or a pie chart that indicates the ratio of the elapsed time to the display time period. Accordingly, the viewer can easily grasp the remaining display time period of the screen currently in view.

Twelfth Embodiment

Next, a twelfth embodiment is described. In the twelfth embodiment, differences from the aforementioned embodiments are described. Points having not been specifically mentioned in the twelfth embodiment may be similar to those in the aforementioned embodiments.

In a case where the target article element group is distributed to multiple screens, there is a possibility that a certain viewer views a certain screen some time after start of displaying the screen, and display of the screen is terminated (the display target screen is switched) before completion of reading the text on the screen.

Accordingly, in the twelfth embodiment, QR Code® or the like indicating the URL of the screen or the target article is displayed on a screen-by-screen basis. Specifically, the layout information is defined such that such QR Code® is displayed for each screen.

Accordingly, the viewer can view the screen on a smartphone or the like, by causing his or her smartphone or the like to read the QR Code® included in the screen in view, thereby allowing the screen to be viewed through the smartphone or the like.

Thirteenth Embodiment

Next, a thirteenth embodiment is described. In the thirteenth embodiment, differences from the aforementioned embodiments are described. Points having not been specifically mentioned in the thirteenth embodiment may be similar to those in the aforementioned embodiments.

In the embodiments described above, in step S222 of FIG. 11, for one record in FIG. 10, the display time period is set using the number of characters, the difficulty and the like on each screen. However, there is no limitation thereto. For example, in the case where multiple records are registered in the event as in FIG. 10, for each record, as described above, it may be calculated whether the target article element group is distributed to multiple screens or not, the average number of characters and the difficulty of series of screens completed as a result of the calculation may be obtained, and the average number of characters and the difficulty per screen over all the article types may be obtained, thereby automatically set the display time period for the screen. Here, it is a matter of course that the number of characters and the difficulty of the article element to be displayed on every screen (for example, "TITLE" etc.) may be excluded from the aggregation target on the second screen and thereafter.

Note that in each embodiment, the size calculation unit 15 is an example of the first calculation unit. The layout adjustment unit 16 is an example of the determination unit and the second calculation unit. The layout adjustment unit 16 and the output content generation unit 17 are an example of the generation unit.

The embodiments of the present invention have thus been described in detail. However, the present invention is not limited to such specific embodiments. Various changes and modifications can be made in the range of the gist of the present invention described in claims.

REFERENCE SIGNS LIST

10 Output content generation device
11 Article registration unit
12 Generation request reception unit
13 Article element acquisition unit
14 Layout acquisition unit
15 Size calculation unit
16 Layout adjustment unit
17 Output content generation unit
20 User terminal
30 Display device
100 Drive device
101 Recording medium
102 Auxiliary storage device
103 Memory device
104 CPU
105 Interface device
121 Article element item storage unit
122 Article information storage unit
123 Layout information storage unit
124 Size parameter storage unit
125 Element size storage unit
126 Layout setting storage unit
B Bus

The invention claimed is:
1. An output content generation device comprising a processor configured to execute a method comprising:
   determining a size of each piece of a plurality of pieces of information to be displayed in a display region of a display device, wherein the display device includes a singular display, the display sequentially displays a screen of a plurality of screens, and the display region corresponds to a region of the screen displayed in the singular display;
   automatically determining, by a processor, whether the plurality of pieces of information fits within the display region of the screen, based on an aggregated size of the plurality of pieces of information and a size of the display region;
   automatically allocating, by the processor, based on the automatic determination of whether the plurality of pieces of information fits within the display region, areas associated with the plurality of pieces of information by distributing placement of the plurality of pieces of information for sequentially displaying at least a part of the plurality of pieces of information over the two or more screens on the singular display; and
   generating content of the pieces of information over the two or more screens of the plurality of screens to sequentially display each screen of the two or more screens on the singular display of the display device at a time.
2. The output content generation device according to claim 1, the processor further configured to execute a method comprising:

determining a display time period for each of the two or more screens, based on the content of the plurality of pieces of information.

3. The output content generation device according to claim 2, wherein the determining the display time period further comprises determining the display time period, for sequentially displaying each screen of the plurality of screens, based on the number of characters of the piece of information allocated to the corresponding screen.

4. The output content generation device according to claim 3,
wherein the determining the display time period further comprises excluding the piece of information to be commonly allocated across the two or more screens from the determining of the display time period.

5. The output content generation device according to claim 2,
wherein the determining the display time period further comprises determining the display time period, for each screen of the plurality of screens, based on difficulty of the each piece of information displayed on the display, the difficulty is associated with a level of familiarity with the piece of information.

6. The output content generation device according to claim 5,
wherein the determining the display time period further comprises excluding the piece of information to be commonly allocated across the two or more screens from the determining of the display time period.

7. The output content generation device according to claim 2,
wherein the determining the display time period further comprises excluding the piece of information to be commonly allocated across the two or more screens from the determining of the display time period.

8. The output content generation device according to claim 1, wherein the display device displays a non-interactive digital signage including non-scrollable content.

9. An output content generation method causing a computer to execute:
determining a size of each piece of a plurality of pieces of information to be displayed in a display region of a display device, wherein the display device includes a singular display, the display sequentially displays a screen of a plurality of screens, and the display region corresponds to a region of the screen displayed on the singular display;
automatically determining, by a processor, whether the plurality of pieces of information fits within the display region of the screen, based on an aggregated size of the plurality of pieces of information and a size of the display region;
automatically allocating, by the processor, based on the automatic determination of whether the plurality of pieces of information fits within the display region, areas associated with the plurality of pieces of information by distributing placement of the plurality of pieces of information for sequentially displaying at least a part of the plurality of pieces of information over the two or more screens on the singular display; and
generating content of the pieces of information over the two or more screens of the plurality of screens to sequentially display each screen of the two or more screens on the singular display of the display device at a time.

10. The method of claim 9, wherein the display device displays a non-interactive digital signage including non-scrollable content.

11. The method of claim 9, the method further comprising:
determining a display time period for each of the two or more screens, based on the content of the plurality of pieces of information.

12. The method of claim 11, wherein the determining the display time period further comprises determining the display time period, for sequentially displaying each screen of the plurality of screens, based on the number of characters of the piece of information allocated to the corresponding screen.

13. The method of claim 12, wherein the determining the display time period further comprises excluding the piece of information to be commonly allocated across the two or more screens from the determining of the display time period.

14. The method of claim 11, wherein the determining the display time period further comprises determining the display time period, for each screen of the plurality of screens, based on difficulty of the each piece of information displayed on the display, the difficulty is associated with a level of familiarity with the piece of information.

15. The method of claim 14, wherein the determining the display time period further comprises excluding the piece of information to be commonly allocated across the two or more screens from the determining of the display time period.

16. A computer-readable non-transitory recording medium storing computer-executable instructions that when executed by a processor cause a computer system to execute a method comprising:
determining a size of each piece of a plurality of pieces of information to be displayed in a display region of a display device, wherein the display device includes a singular display, the display sequentially displays a screen of a plurality of screens, and the display region corresponds to a region associated with the screen displayed in the singular display;
automatically determining, by a processor, whether the plurality of pieces of information fits within the display region of the screen, based on an aggregated size of the plurality of pieces of information and a size of the display region;
automatically allocating, by a processor, based on the automatic determination of whether the pieces of information fits within the display region, areas associated with the plurality of pieces of information by distributing placement of the plurality of pieces of information for sequentially displaying at least a part of the plurality of pieces of information over the two or more screens on the singular display; and
generating content of the pieces of information over the two or more screens of the plurality of screens to sequentially display each screen of the two or more screens on the singular display of the display device at a time.

17. The computer-readable non-transitory recording medium of claim 16,
wherein the display device represents a non-interactive digital signage.

18. The computer-readable non-transitory recording medium of claim 16, the computer-executable instructions when executed further causing the system to:

determine a display time period for each of the two or more screens, based on the content of the plurality of pieces of information.

19. The computer-readable non-transitory recording medium of claim 18, wherein the determining the display time period further comprises determining the display time period, for sequentially displaying each screen of the plurality of screens, based on the number of characters of the piece of information allocated to the corresponding screen.

20. The computer-readable non-transitory recording medium of claim 18, wherein the determining the display time period further comprises determining the display time period, for each screen of the plurality of screens, based on difficulty of the each piece of information displayed on the display, the difficulty is associated with a level of familiarity with the piece of information.

* * * * *